United States Patent
Choi et al.

(10) Patent No.: US 11,385,705 B2
(45) Date of Patent: Jul. 12, 2022

(54) DISPLAY APPARATUS AND OPERATING METHOD THEREOF

(71) Applicant: SAMSUNG ELECTRONICS CO., LTD., Suwon-si (KR)

(72) Inventors: Hyunseok Choi, Suwon-si (KR); Cheulhee Hahm, Suwon-si (KR); Yoojin Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 28 days.

(21) Appl. No.: 16/958,842

(22) PCT Filed: Dec. 24, 2018

(86) PCT No.: PCT/KR2018/016561
§ 371 (c)(1),
(2) Date: Jun. 29, 2020

(87) PCT Pub. No.: WO2019/132464
PCT Pub. Date: Jul. 4, 2019

(65) Prior Publication Data
US 2021/0011540 A1    Jan. 14, 2021

(30) Foreign Application Priority Data
Dec. 28, 2017    (KR) .......................... 10-2017-0182560

(51) Int. Cl.
*G06F 1/00*    (2006.01)
*G06F 1/3234*    (2019.01)
(Continued)

(52) U.S. Cl.
CPC .......... *G06F 1/3265* (2013.01); *G06F 1/3218* (2013.01); *G06F 1/3225* (2013.01); *G06F 1/3203* (2013.01)

(58) Field of Classification Search
CPC ..... G06F 1/3265; G06F 1/3218; G06F 1/3225
(Continued)

(56) References Cited

U.S. PATENT DOCUMENTS

| 6,243,831 B1 | 6/2001 | Mustafa et al. |
| 6,618,813 B1 * | 9/2003 | Hsu ........................ G06F 1/3203 713/310 |

(Continued)

FOREIGN PATENT DOCUMENTS

| CN | 101911031 A | 12/2010 |
| CN | 102725709 A | 10/2012 |

(Continued)

OTHER PUBLICATIONS

International Search Report dated Mar. 29, 2019 issued by the International Searching Authority in counterpart International Application No. PCT/KR2018/016561 (PCT/ISA/210).

(Continued)

*Primary Examiner* — Volvick Derose
(74) *Attorney, Agent, or Firm* — Sughrue Mion, PLLC

(57) ABSTRACT

A display apparatus and an operation method thereof are provided. The display apparatus includes: a volatile memory; a nonvolatile memory; and a processor configured to: determine stability of a system for the display apparatus; when a power-off input for the display apparatus is received, if the system is determined to be stable, enter a power-saving mode while maintaining power supply to the volatile memory in which execution data regarding an application currently being executed is stored; and if the system is determined to be unstable, perform power-off processing after storing execution status information of at least one application being executed in the nonvolatile memory, perform booting to execute the application by using application execution status information stored in the nonvolatile (Continued)

memory, and store the execution data regarding the executed application in the volatile memory and then enter the power saving mode while maintaining the power supply to the volatile memory.

15 Claims, 16 Drawing Sheets

(51) Int. Cl.
   *G06F 1/3218* (2019.01)
   *G06F 1/3225* (2019.01)
   *G06F 1/3203* (2019.01)
(58) Field of Classification Search
   USPC .......................................................... 713/323
   See application file for complete search history.

(56) References Cited

U.S. PATENT DOCUMENTS

| | | | |
|---|---|---|---|
| 7,853,825 B2 | 12/2010 | Varadarajan et al. | |
| 7,971,081 B2 | 6/2011 | Cooper et al. | |
| 8,504,850 B2 | 8/2013 | Wu et al. | |
| 8,819,336 B2 | 8/2014 | Kwon et al. | |
| 8,996,852 B2 | 3/2015 | Seo et al. | |
| 9,182,999 B2 | 11/2015 | Lueck et al. | |
| 9,594,422 B2 | 3/2017 | Baik | |
| 9,804,662 B2 | 10/2017 | Park et al. | |
| 10,394,570 B2 | 8/2019 | Baik et al. | |
| 10,795,423 B2 | 10/2020 | Yamashita | |
| 2002/0116588 A1* | 8/2002 | Beckert | G06F 12/122 711/161 |
| 2006/0059380 A1* | 3/2006 | Kimura | G06F 1/3296 713/323 |
| 2006/0123258 A1* | 6/2006 | Westerinen | G06F 1/305 713/300 |
| 2007/0130480 A1* | 6/2007 | Hill | G06F 9/4418 713/300 |
| 2007/0149256 A1* | 6/2007 | Burgan | H04W 52/0254 455/574 |
| 2007/0162785 A1* | 7/2007 | Downer | G06F 11/1402 714/15 |
| 2011/0055539 A1* | 3/2011 | Sasaki | G06F 9/4406 713/2 |
| 2011/0185208 A1 | 7/2011 | Iwamoto et al. | |
| 2011/0197018 A1* | 8/2011 | Noh | G06F 1/30 711/103 |
| 2011/0213954 A1* | 9/2011 | Baik | G06F 9/4418 713/2 |
| 2012/0042206 A1* | 2/2012 | Di Domenico | G06F 11/1441 714/15 |
| 2012/0272050 A1* | 10/2012 | Seo | G06F 9/4403 713/2 |
| 2012/0272230 A1* | 10/2012 | Lee | G06F 8/65 717/173 |
| 2013/0061090 A1* | 3/2013 | Lee | G06F 11/1417 714/16 |
| 2013/0166932 A1* | 6/2013 | Iarovici | G06F 1/3231 713/323 |
| 2013/0305069 A1* | 11/2013 | Goda | G03G 15/5016 713/323 |
| 2014/0025874 A1* | 1/2014 | Kwon | G06F 12/0246 711/103 |
| 2014/0040645 A1* | 2/2014 | Hiraike | G06F 1/3284 713/320 |
| 2014/0208145 A1* | 7/2014 | Piccolotto | G06F 1/3231 713/324 |
| 2015/0253834 A1* | 9/2015 | Park | G09G 5/00 345/211 |
| 2016/0103477 A1* | 4/2016 | Park | G06F 9/4418 713/323 |
| 2016/0147278 A1* | 5/2016 | Yoon | G06F 1/3265 713/323 |
| 2016/0274804 A1* | 9/2016 | Tsuji | G06F 3/0625 |
| 2017/0019701 A1 | 1/2017 | Kim | |
| 2017/0220357 A1 | 8/2017 | Choi et al. | |
| 2018/0095518 A1* | 4/2018 | Guo | H04W 52/0267 |

FOREIGN PATENT DOCUMENTS

| | | |
|---|---|---|
| CN | 104412224 A | 3/2015 |
| CN | 104850435 A | 8/2015 |
| CN | 107066072 A | 8/2017 |
| EP | 1 416 381 A1 | 5/2004 |
| KR | 10-2012-0118738 A | 10/2012 |
| KR | 10-2013-0033813 A | 4/2013 |
| KR | 1020150074637 A | 7/2015 |
| KR | 10-1602939 B1 | 3/2016 |
| KR | 10-2016-0043798 A | 4/2016 |
| KR | 10-2016-0060968 A | 5/2016 |
| KR | 10-1636870 B1 | 7/2016 |
| KR | 10-2017-0091436 A | 8/2017 |

OTHER PUBLICATIONS

International Written Opinion dated Mar. 29, 2019 issued by the International Searching Authority in counterpart International Application No. PCT/KR2018/016561 (PCT/ISA/237).
Communication dated Jul. 24, 2020 issued by the European Intellectual Property Office in counterpart European Application No. 18894836.8.
Communication dated Dec. 6, 2021 issued by the Korean Intellectual Property Office in counterpart Korean Application No. 10-2017-0182560.
Communication dated Nov. 19, 2021 issued by the State Intellectual Property Office of P.R. China in counterpart Chinese application No. 201880089890.4.
Communication dated Nov. 11, 2021 issued by the Indian Patent Office in counterpart Indian Application No. 202047030795.
Communication dated Mar. 2, 2022 issued by the Korean Intellectual Property Office in application English No. 10-2017-0182560 Translation.

* cited by examiner

DISPLAY APPARATUS AND OPERATING METHOD THEREOF

CROSS-REFERENCE TO RELATED APPLICATIONS

This application is a National Stage of International Application No. PCT/KR2018/016561, filed Dec. 24, 2018, claiming priority based on Korean Patent Application No. 10-2017-0182560, filed Dec. 28, 2017, the contents of all of which are incorporated herein by reference in their entirety.

TECHNICAL FIELD

Various embodiments relate to a display apparatus and an operation method thereof, and more particularly, to a display apparatus and an operation method thereof, which are capable of stably providing, when the display apparatus is powered back on, a screen of an application that was being executed before the display apparatus was powered off.

BACKGROUND ART

An image display apparatus is equipped with a function of displaying an image viewable by a user. The user may watch a broadcast program on the image display apparatus. The image display apparatus displays, on a display, a broadcast program selected by the user among broadcast signals transmitted by a broadcasting station. Worldwide, broadcasting is currently undergoing a transition from analog to digital broadcasting.

Digital broadcasting refers to broadcasting services that transmit digital images and audio signals. As compared to analog broadcasting, digital broadcasting has little data loss due to robustness against external noise, is advantageous for error correction, and provides a high resolution, clear screen. Furthermore, digital broadcasting enables delivery of bidirectional services unlike analog broadcasting.

In addition, recently, smart TVs have been developed to provide various types of content in addition to digital broadcasting functions. The smart TVs do not operate passively as selected by the user but aim to analyze user preferences and provide desired services without manipulation by the user.

DESCRIPTION OF EMBODIMENTS

Technical Problem

Various embodiments provide a display apparatus and an operation method thereof, which are capable of displaying, when powered back on, a previous application that was being executed by storing information related to execution of the previous application even when a system error occurs during power-off of the display apparatus.

Various embodiments also provide a display apparatus and an operation method thereof, which are capable of displaying a previous application that was being executed when the display apparatus is powered on at a later time even after power supply is cut off due to an unexpected event such as a power outage by storing in a nonvolatile memory information related to execution of the previous application even when a normal suspend to RAM mode is entered because a system error does not occur during power-off of the display apparatus.

Solution to Problem

To solve the problems, a display apparatus and an operation method thereof are provided. The display apparatus includes: a volatile memory; a nonvolatile memory; and a processor configured to: determine stability of a system for the display apparatus; when a power-off input for the display apparatus is received, if the system is determined to be stable, enter a power-saving mode while maintaining power supply to the volatile memory in which execution data regarding an application currently being executed is stored: and if the system is determined to be unstable, perform power-off processing after storing execution status information of at least one application being executed in the nonvolatile memory, perform booting to execute the application by using application execution status information stored in the nonvolatile memory, and store the execution data regarding the executed application in the volatile memory and then enter the power saving mode while maintaining the power supply to the volatile memory.

Advantageous Effects of Disclosure

According to embodiments, by storing a last execution status of an application in a nonvolatile memory even when a software error or internal system problem occurs during power-off of a display apparatus, it is possible to execute and display the application by using the last execution status when the display apparatus is powered back on, thereby achieving improved usability for a user.

BEST MODE

Figure 1:
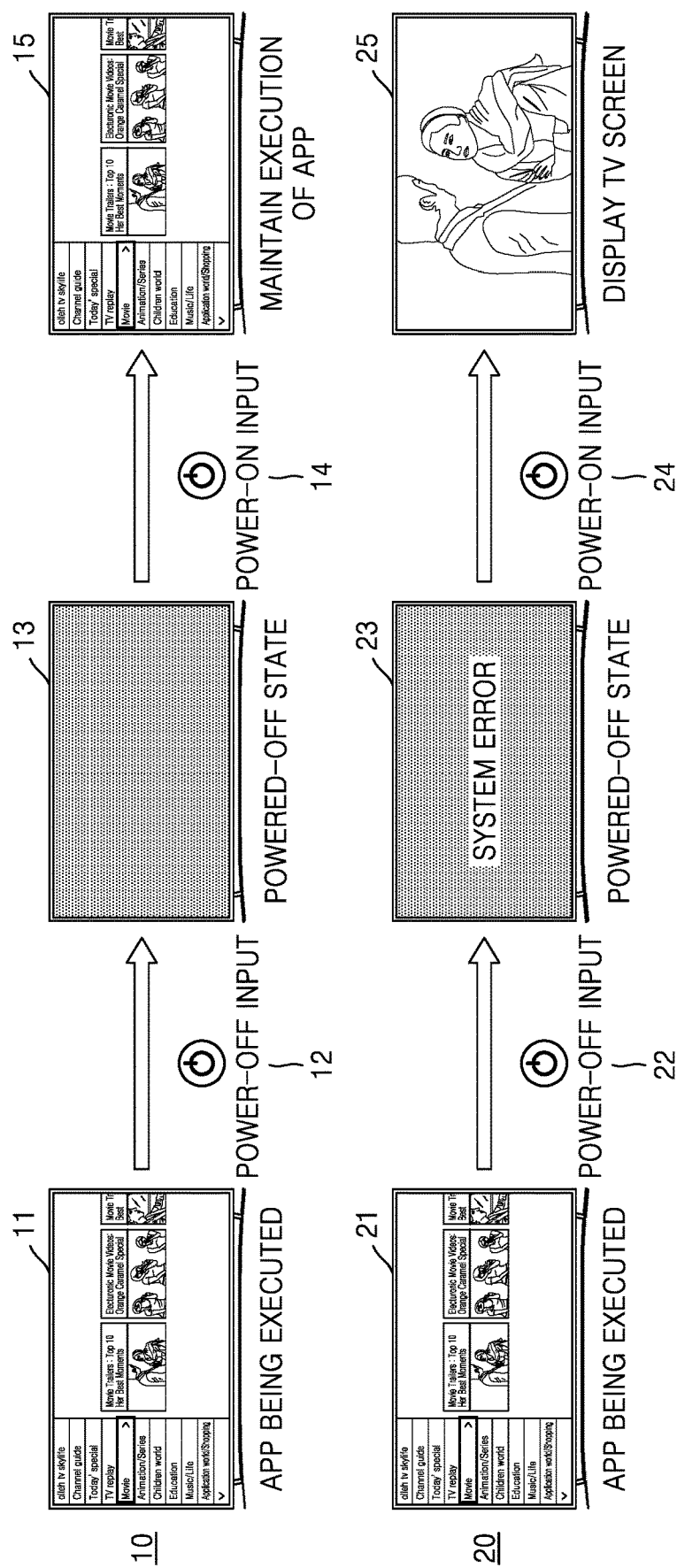
FIG. 1 is a reference diagram for explaining a concept according to embodiments.

According to an embodiment, a display apparatus includes: a volatile memory; a nonvolatile memory; and a processor configured to: determine stability of a system for the display apparatus; when a power-off input for the display apparatus is received, if the system is determined to be stable, enter a power-saving mode while maintaining power supply to the volatile memory in which execution data regarding an application currently being executed is stored; and if the system is determined to be unstable, perform power-off processing after storing execution status information of at least one application being executed in the nonvolatile memory, perform booting to execute the application by using application execution status information stored in the nonvolatile memory, and store the execution data regarding the executed application in the volatile memory and then enter the power saving mode while maintaining the power supply to the volatile memory.

The processor may, when receiving a power-on input for the display apparatus that is in a power saving mode, resume execution of the application by using the execution data regarding the application, which is stored in the volatile memory.

The application execution status information may include at least one of an identifier of the application, location information for accessing the application, and execution position information of the application.

The execution data regarding the application may include an application program being executed and data related to execution of the application.

If the system is determined to be unstable, the processor may maintain a display of the display apparatus in an off state when performing booting after the power-off processing.

The processor may determine the stability of the system in response to the receiving of the power-off input.

If the system is determined to be unstable, the processor may store data representing the stability of the system in the volatile memory or the nonvolatile memory, and determine, in response to the receiving of the power-off input, a method of entering the power saving mode by referring to the data representing the stability of system, the data being stored in the volatile memory or the nonvolatile memory.

According to another embodiment, an operation method of a display apparatus includes: determining stability of a system for the display apparatus: receiving a power-off input for the display apparatus; if the system is determined to be stable, entering a power-saving mode while maintaining power supply to a volatile memory in which execution data regarding an application currently being executed is stored; and if the system is determined to be unstable, performing power-off processing after storing execution status information of at least one application being executed in a nonvolatile memory, performing booting to execute the application by using application execution status information stored in the nonvolatile memory, and storing the execution data regarding the executed application in the volatile memory and then entering the power saving mode while maintaining the power supply to the volatile memory.

The operation method of the display apparatus may further include, when receiving a power-on input for the display apparatus that is in a power saving mode, resuming execution of the application by using the execution data regarding the application, which is stored in the volatile memory.

According to another embodiment, a computer-readable recording medium having stored therein a program for performing an operation method of a display apparatus is provided.

MODE OF DISCLOSURE

Terms used in the present specification will now be briefly described and then the present disclosure will be described in detail.

The terms used in the present disclosure are general terms currently widely used in the art based on functions described in the present disclosure, but may have different meanings according to an intention of one of ordinary skill in the art, precedent cases, advent of new technologies, etc. Furthermore, some terms may be arbitrarily selected by the applicant, and in this case, the meaning of the selected terms will be described in detail in the detailed description of the disclosure. Thus, the terms used herein should be defined not by simple appellations thereof but based on the meaning of the terms together with the overall description of the disclosure.

Throughout the specification, when a part "includes" or "comprises" an element, unless there is a particular description contrary thereto, the part can further include other elements, not excluding the other elements. Furthermore, terms such as "portion," "module," etc. used herein indicate a unit for processing at least one function or operation and may be embodied as hardware or software or a combination of hardware and software.

Embodiments of the present disclosure will now be described more fully hereinafter with reference to the accompanying drawings so that they may be easily implemented by one of ordinary skill in the art. However, the present disclosure may have different forms and should not be construed as being limited to the descriptions set forth herein. Parts not related to the present disclosure are omitted to clarify the description of embodiments thereof, and like reference numerals denote like elements throughout.

In the embodiments of the present disclosure, the term "user" may refer to a person who controls a function or operation of an image display apparatus by using a control device, and include a viewer, a manager, or an installation engineer.

FIG. 1 is a reference diagram for explaining a concept according to embodiments.

Referring to 10 of FIG. 1, when a display apparatus receives a power-off input while executing an application 11 (12), the display apparatus enters a powered-off state (13). At this time, the display apparatus may cut off power supply to most of the internal components, including a screen of a display, but supply a minimum amount of power to a volatile memory that has stored status information of an application that was being executed. By supplying the minimum amount of power to the volatile memory in this way, the display apparatus may maintain in the volatile memory, even when it is in a powered-off state, status information of the application that was being executed on the display apparatus prior to powering off. A mode in which contents of a volatile memory are maintained by supplying a minimum amount of power even when an electronic device is powered off is called a suspend to RAM mode. When receiving a power-on input (14), the display apparatus may execute the application that was being executed before being powered off and display an execution screen by using the status information of the application maintained in the volatile memory during booting. Thus, the user may confirm that the application, which was being executed before the display apparatus was powered off, is immediately put into an execution state and displayed on the display apparatus when the display apparatus is powered on.

Referring to 20 of FIG. 1, when the display apparatus receives a power-off input while executing the application 21 (22), the display apparatus enters a powered-off state (23). When the display apparatus detects a system error caused by various factors during its power-off process, the display apparatus performs a cold power-off. During the cold power-off, the display apparatus may not enter a suspend to RAM mode and cut off power supply to all components of the display apparatus including a volatile memory, so the display apparatus may not retain information stored in the volatile memory. When the display apparatus receives a power-on input (24), the display apparatus may be cold booted, and because execution status information of the previously executed application has not been stored in the volatile memory, the display apparatus may receive, for example, a TV signal as an image supply source and display a TV screen on the display according to a policy associated with an initialization state of the display apparatus, Thus, because the contents of the volatile memory may not be maintained when the system error occurs during power-off processing by the display apparatus, the display apparatus may not be able to execute the application that was being executed before being powered off during its power-on, which may inconvenience the user.

Considering this problem, according to various embodiments of the present specification, the display apparatus may be configured to maintain execution status information of an application that was being executed even when a system error occurs during its power-off processing, thereby automatically executing the previous application when powered back on.

Figure 2:
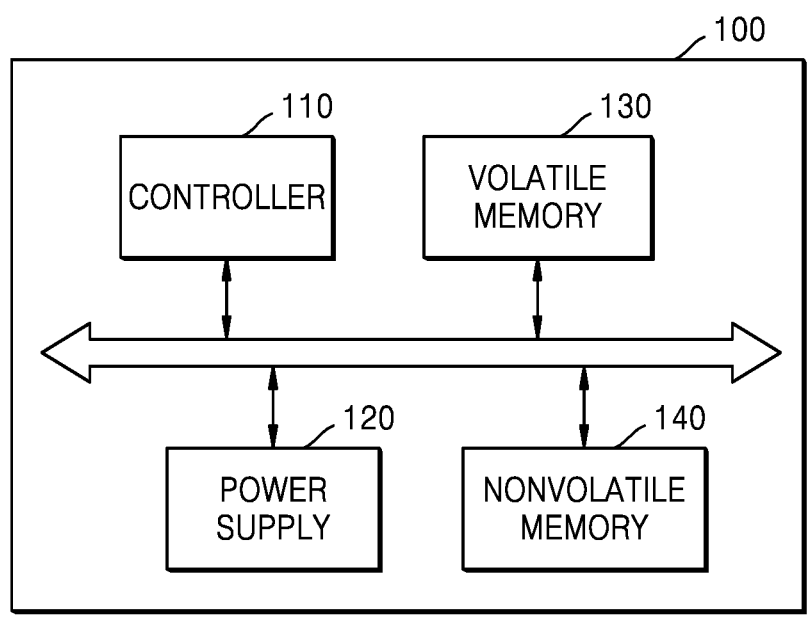
FIG. 2 is schematic block diagram of a display apparatus 100 according to an embodiment.

FIG. 2 is schematic block diagram of a display apparatus 100 according to an embodiment.

Referring to FIG. 2, the display apparatus 100 includes a controller 110, a power supply 120, a volatile memory 130, and a nonvolatile memory 140.

The display apparatus 100 may be implemented as various electronic devices such as a TV, a desktop PC, a handheld personal assistant (PA), a personal information terminal, etc.

The display apparatus 100 may be configured to perform a power saving mode as a technique for a power management function. In detail, the display apparatus 100 enters a power saving mode as a technique for a power management function while storing data being worked on in a volatile memory or a nonvolatile memory. To achieve this, a suspend to RAM mode and a suspend to disk mode may be provided.

In a suspend to RAM mode, when the system enters a low power state, most of the system's components are powered off while power supply to a main memory is maintained, the main memory being a volatile memory that stores information about a system configuration, running applications, and active files. In the suspend to RAM mode, the system may be kept at a lowest power, most of which is used for retention of data in the main memory.

When in the suspend to RAM mode, the system may wake up at any time to perform tasks. However, when power is interrupted, the system has to undergo a normal rebooting process, and all information not stored in a nonvolatile memory is lost.

The task of putting a computer in an initial state so that it is ready for use is called booting or a boot. After performing a power-on self-test to check a system when the computer is initially turned on, an operating system (OS) is read into RAM that is volatile memory. When an OS program is successfully read into the RAM, the computer is ready to receive a user's commands, which means the computer is booted. In a suspend to RAM mode, data may be preserved during power-off by storing data being worked on in a volatile memory such as RAM during a power saving mode or power-off and then reading the data from the RAM after booting when the system powers on. A suspend to disk mode is a mode in which power is cut off after storing data being worked on in a nonvolatile memory such as flash memory. In the suspend to disk mode, excellent power saving performance is achieved by completely cutting off the power, but power-off time and boot time are slow, as compared to the suspend to RAM mode.

The power supply 120 supplies power to each function block of the display apparatus 100.

The volatile memory 130 is a computer memory that requires electricity to maintain stored information and refers to a general-purpose random access memory (RAM) including dynamic RAM (DRAM) and static RAM (SRAM), Data being worked on may be stored according to a suspend to RAM function. When one or more applications are executed by the controller 110, the volatile memory stores code of the executed application and data to be processed or processed by the application. Data related to processing by the application and the code of application may be referred to as application execution data.

The nonvolatile memory (NVM or NVRAM) 140 is a computer memory that retains stored information even when power is not supplied and may be implemented as read-only memory (ROM), flash memory, a hard disk, etc., and retrieve data being worked on from the volatile memory 130 and store the retrieved data according to a suspend to disk function.

According to an embodiment, the nonvolatile memory 140 may store execution status information of an application, which corresponds to application execution data stored in the volatile memory 130.

The controller 110 may include one or more processors, and control all components of the display apparatus 100.

According to an embodiment, the controller 110 may determine the system stability for the display apparatus and may enter a power saving mode according to a result of the determining whether the system status is stable in response to receiving a power-off input for the display apparatus.

According to an embodiment, when the system is determined to be stable, i.e., system status of the display apparatus is determined to be stable, the controller 110 may enter a power saving mode while maintaining power supply to the volatile memory in which application execution data corresponding to an application currently being executed is stored.

According to an embodiment, when the system is determined to be unstable, the controller 110 may perform power-off processing after storing in the nonvolatile memory execution status information of one or more applications being executed, perform booting to execute an application by using application execution status information stored in the nonvolatile memory, store execution data regarding the executed application in the volatile memory, and then enter a power saving mode while maintaining power supply to the volatile memory.

According to an embodiment, when receiving a power-on input for the display apparatus that is in a power saving mode, the controller 110 may resume execution of an application by using execution data regarding the application, which is stored in the volatile memory.

According to an embodiment, application execution status information may include at least one of an identifier of an application that was being executed, location information for accessing the application, and execution position information of the application.

According to an embodiment, execution data regarding an application may include an application program being executed and data related to execution of the application.

According to an embodiment, when the system is determined to be unstable, the controller 110 may maintain a display of the display apparatus in an off state when performing booting after the power-off processing.

According to an embodiment, the controller 110 may determine system stability in response to receiving a power-off input.

According to an embodiment, when the system is determined to be unstable, the controller 110 may store data representing stability of the system in the volatile or nonvolatile memory, and determine, in response to receiving a power-off input, a method of entering a power saving mode by referring to the data representing the system stability stored in the volatile or nonvolatile memory.

Figure 3:
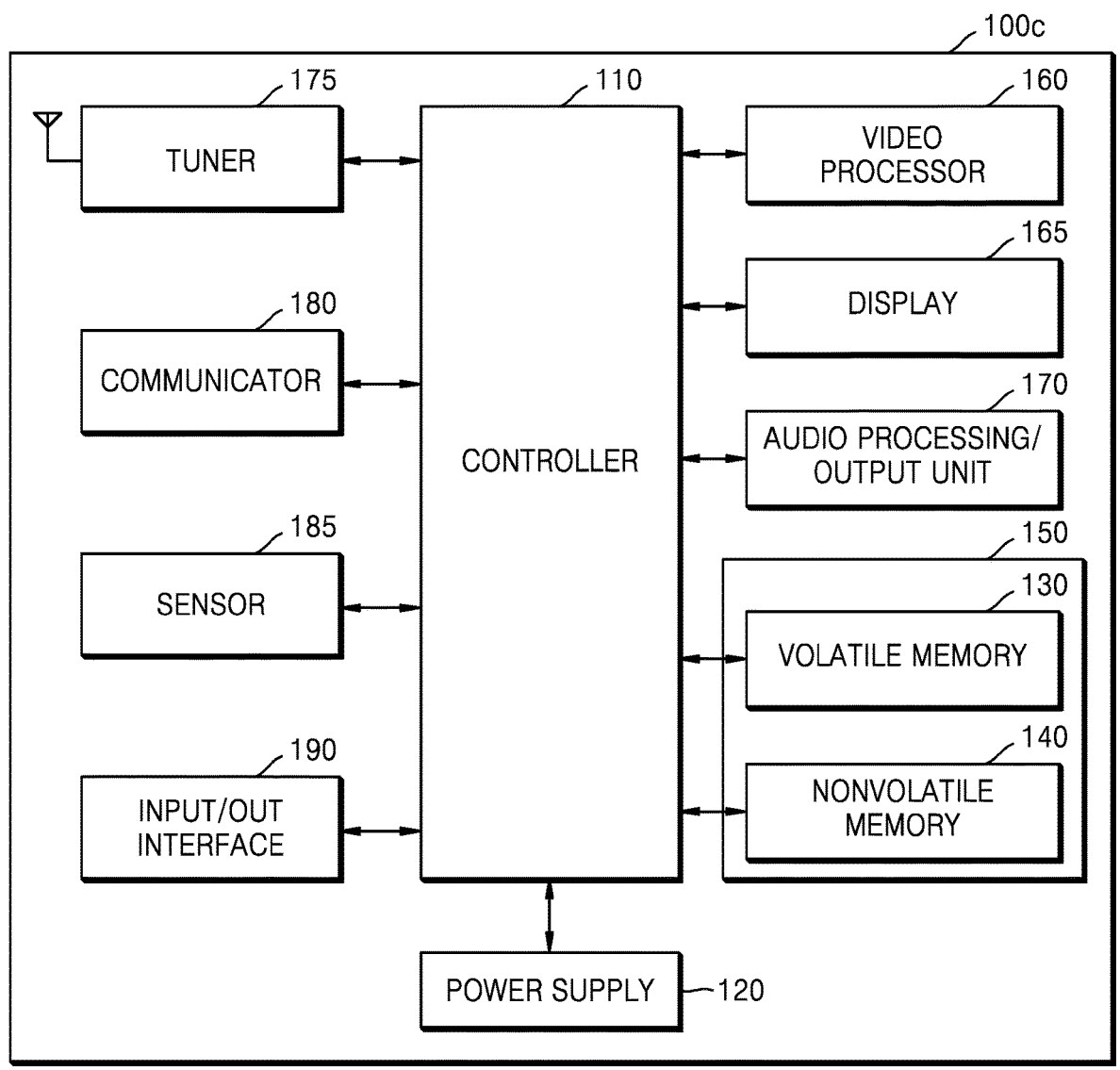
FIG. 3 is a detailed block diagram of a display apparatus according to an embodiment.

FIG. 3 is a detailed block diagram of a display apparatus according to an embodiment.

Referring to FIG. 3, a display apparatus 100c includes a controller 110, a power supply 120, a memory 150 including a volatile memory 130 and a nonvolatile memory 140, a video processor 160, a display 165, an audio processing/output unit 170, a tuner 175, a communicator 180, a sensor 185, and an input/output interface 190.

Descriptions that are provided above with respect to FIG. 2 are omitted in the following description with reference to FIG. 3.

According to an embodiment, the display apparatus 100 may be a TV, but this is merely an example and may be implemented as an electronic device including a display. For example, the display apparatus 100 may be implemented as various electronic devices such as a mobile phone, a digital camera, a camcorder, a notebook computer (a laptop computer), a tablet PC, a desktop PC, an electronic-book terminal, a digital broadcasting terminal, a personal digital assistant (PDA), a portable multimedia player (PMP), a navigation device, an MP3 player, a wearable device, etc. The display apparatus 100 may be implemented as a flat display apparatus as well as a curved display apparatus that is a screen having a curvature or a flexible display apparatus capable of adjusting a curvature.

The video processor 160 performs processing on video data received by the display apparatus 100. The video processor 160 may perform various types of image processing, such as decoding, scaling, noise filtering, frame rate conversion, and resolution conversion, on the video data.

The display 165 displays a video included in a broadcast signal received through the tuner 175 on a screen according to control by the controller 110. Furthermore, the display 165 may display content (e.g., a moving image) input via the communicator 180 or the input/output interface 190. The display 165 may output an image stored in the memory content according to control by the controller 110.

The display 165 generates a driving signal by converting an image signal, a data signal, an on-screen display (OSD) signal, a control signal, etc. The display 165 may be implemented as a plasma display panel (PDP), a liquid crystal display (LCD), an organic light-emitting diode (OLED) display, a flexible display, a three-dimensional (3D) display, or the like. Furthermore, the display 165 may be configured as a touch screen for use as an input device as well as an output device.

The audio processing/output unit 170 processes audio data. The audio processing/output unit 170 may perform various types of processing, such as decoding, amplification, noise filtering, etc., on the audio data. Furthermore, the audio processing/output unit 170 may include, for example, at least one of a speaker, a headphone output terminal, and a Sony/Philips digital interface (S/PDIF) output terminal.

By performing amplification, mixing, resonance, etc. of a broadcast signal received in a wired or wireless manner, the tuner 175 may tune to and select only a frequency of a channel that is to be received by the display apparatus 100 from among many radio wave components. The broadcast signal may include, for example, audio, video, and additional information (e.g., an electronic program guide (EPG)).

The communicator 180 may connect the display apparatus 100 to an external device (e.g., an audio device, etc.) according to control by the controller 110. The controller 110 may transmit or receive content to or from the external device connected via the communicator 180, download an application from the external device, or perform web browsing. The communicator 180 may include a wireless LAN (WLAN) interface, a Bluetooth interface, a Bluetooth Low Energy (BLE) interface, a Near Field Communication (NFC) interface, a wired Ethernet interface, etc., in correspondence to the performance and structure of the display apparatus 100. Furthermore, the communicator 180 may receive a control signal from a remote controller according to control by the controller 110. The control signal may be implemented as a Bluetooth type, a radio frequency (RF) signal type, or a Wi-Fi type.

The sensor 185 detects a user's voice, images, or interactions, and may include a microphone, a camera, and a light receiver. The light receiver receives an optical signal (including a control signal) from an external remote controller. For example, the light receiver may receive a power-on input or power-off input for the display apparatus 100 from the external remote controller.

The input/output interface 190 receives video (e.g., a moving image, etc.), audio (e.g., voice, music, etc.), additional information (e.g., an EPG, etc.), etc. from outside the display apparatus 100 according to control by the controller 110, The input/output interface 190 may include one of a High-Definition Multimedia Interface (HDMI) port, a component jack, a PC port, and a Universal Serial Bus (USB) port, or a combination thereof.

The memory 150 may store various pieces of data, programs, or applications for driving and controlling the display apparatus 100 according to control by the controller 110, The memory 150 may store an input/output signal or data corresponding to driving of each of the components of the display apparatus 100

The memory 150 may store an OS for controlling the display apparatus 100 and the controller, an application originally provided by a manufacturer or downloaded from outside, a graphical user interface (GUI) related to an application (graphical user interface), and an object for providing a GUI (e.g., an image, a text, an icon, a button, etc.), user information, documents, databases, or related data.

The memory 150 includes the volatile memory 130 and the nonvolatile memory 140. The volatile memory 130 is a memory that retains stored information while power supply is being maintained, while the nonvolatile memory 140 is a memory that retains stored information even when the power supply is interrupted. The volatile memory 130 may include DRAM, SRAM, etc., and the nonvolatile memory 140 may include ROM, flash memory, memory cards (e.g., a micro SD card and a USB memory), hard disk drives (HDDs), or solid state drives (SSDs).

The volatile memory 130 may store an OS loaded when the system boots, one or more application programs being executed, and input/output data related to application execution.

The controller 110 includes one or more processors that control all the operations of the display apparatus 100 and a flow of signals between the internal components of the display apparatus 100 and process data. When there is an input by the user or predetermined and stored conditions are satisfied, the controller 110 may execute an OS and various applications stored in the memory 150.

The block diagram of the display apparatus 100 is provided for illustration of an embodiment. Each of the components in the block diagram may be integrated, added, or omitted according to the specification of the display apparatus 100 that is actually implemented. In other words, two or more components may be combined into a single component, or a single component may be split into two or more components if necessary. Functions performed in each block are intended to describe embodiments, and a specific operation or apparatus related to the functions does not limit the scope of the present disclosure.

Figure 4:
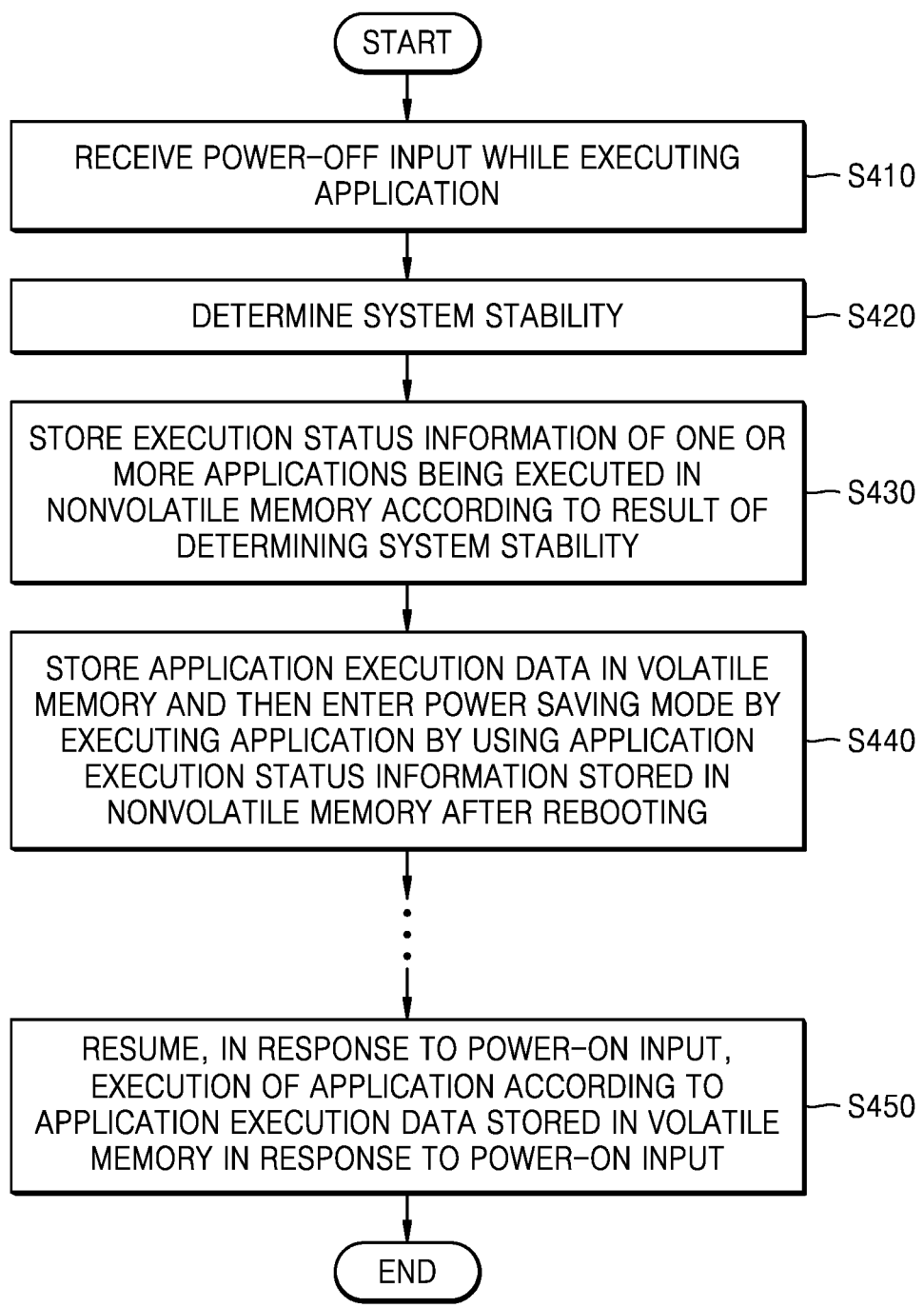
FIG. 4 is a flowchart of an example of an operation method of a display apparatus according to an embodiment.

FIG. 4 is a flowchart of an example of an operation method of a display apparatus according to an embodiment.

Referring to FIG. 4, in operation S410, the display apparatus 100 may receive a power-off input while executing an application. For example, the display apparatus 100 may receive a power-off input via a user input device provided therein or receive a power-off input from a remote controller via the communicator 180 or the sensor 185.

In operation S420, the display apparatus 100 may determine system stability as one of the power-off processing operations in response to the power-off input being received.

To determine system stability, the display apparatus 100 may check whether a running application is operating normally, whether a system internal memory is operating normally, whether a system driver or the like is malfunctioning, whether a collision (crash) occurs between running applications, whether a reboot is required due to a software update, etc. For example, the display apparatus 100 may store a value related to the system stability by using a specific memory or a specific portion of a memory while the display apparatus 100 is operating. In other words, the display apparatus 100 may store, in a specific memory or a specific location in a memory, a value representing whether a running application is operating normally, a value representing whether a system driver or the like is malfunctioning, a value representing whether a collision (crash) occurs between running applications, a value representing whether a reboot is required due to a software update, etc. The display apparatus 100 may then determine the system stability by reading a stored value related to the system stability in response to the power-off input. The specific memory may include both a volatile memory and a nonvolatile memory.

While it has been described with reference to FIG. 4 that the system stability is determined after receiving the power-off input, the present disclosure is not limited thereto. The display apparatus 100 may determine the system stability before receiving the power-off input, and when the power-off input is received, the display apparatus 100 may refer to a result of determining the system stability.

In operation S430, the display apparatus 100 may store execution status information of one or more applications that are being executed in the nonvolatile memory 140 according to a result of the determining of the system stability.

When one or more applications are being executed in the display apparatus 100, application execution data may be stored in the volatile memory 130.

Figure 5:
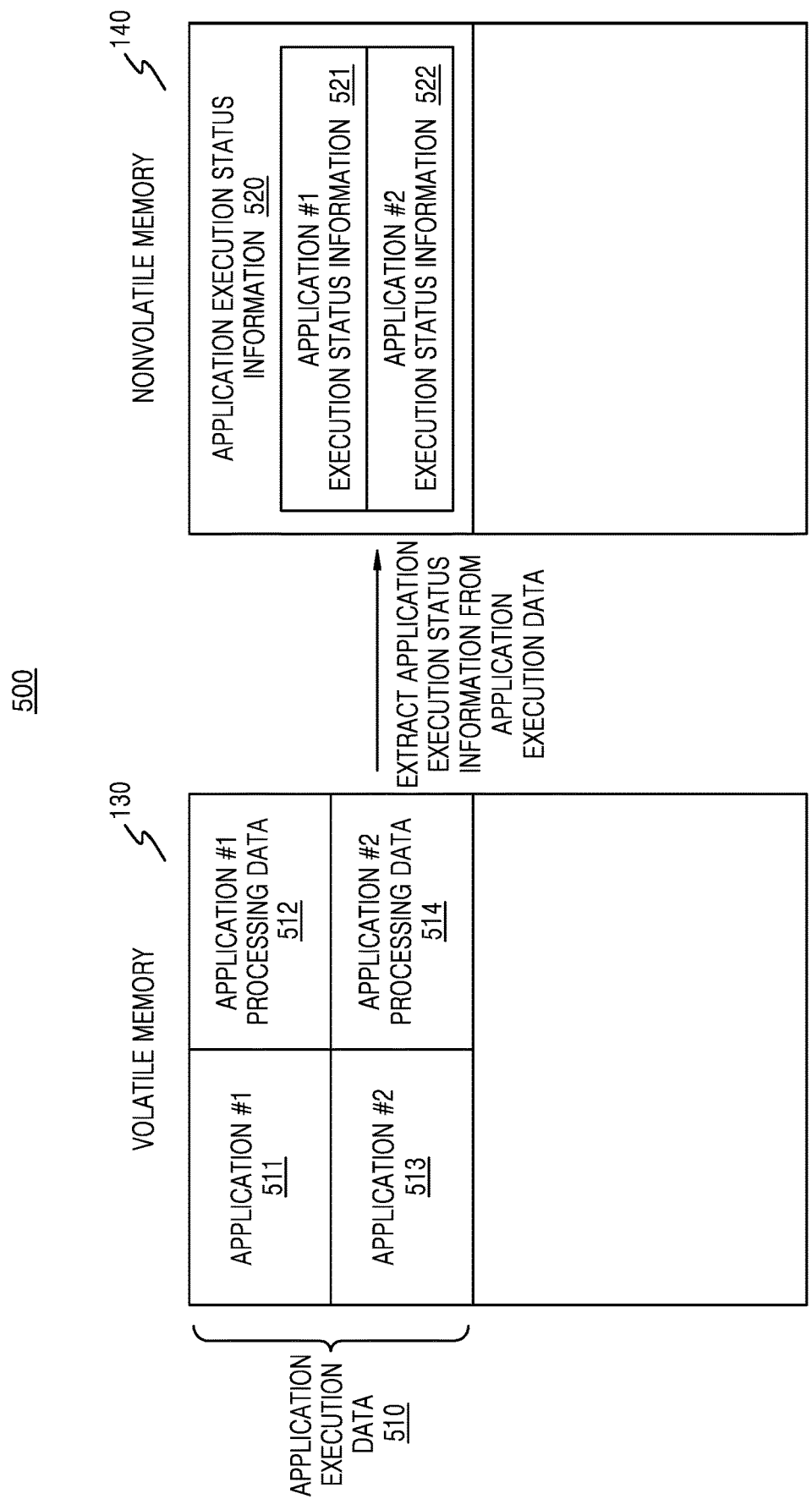
FIG. 5 illustrates an example of storing application execution status information in a nonvolatile memory by using application execution data stored in a volatile memory, according to an embodiment.

FIG. 5 illustrates an example of storing application execution status information in a nonvolatile memory by using application execution data stored in a volatile memory, according to an embodiment.

Referring to 500 of FIG. 5, the volatile memory 130 stores application execution data 510. The application execution data 510 may include one or more application programs and data related to execution of one or more applications. FIG. 5 shows that the application execution data 510 includes application #1 511, application #1 processing data 512, application #2 513, and application #2 processing data 514.

The display apparatus 100 may extract application execution status information from the application execution data 510 stored in the volatile memory 130 and store the extracted application execution status information in the nonvolatile memory 140. Referring to FIG. 5, the application execution status information 520 includes application #1 execution status information 521 and application #2 execution status information 522. The application execution status information may include, for example, at least one of an identifier of an application that was being executed, application location information, application execution position information, application foreground/background state information, and a submenu or focus position information in the application that was being executed. In operation S440, the display apparatus 100 may store application execution data in the volatile memory and then enter a power saving mode by executing the application by using the application execution status information stored in the nonvolatile memory after rebooting. The rebooting may include powering off and rebooting the displaying apparatus 100.

By powering off the display apparatus 100 in operation S440 after storing the application execution status information in the nonvolatile memory in operation S430, the power supply 120 of the display apparatus 100 interrupts supply of power to most of the components including the volatile memory 130. Thus, all data including application execution data, which were stored in the volatile memory 130, is not maintained in the volatile memory 130 when the display apparatus 100 is powered off. Then, after rebooting, the display apparatus 100 may store application execution data in the volatile memory by executing the application by using the application execution status information stored in the nonvolatile memory.

Figure 6:
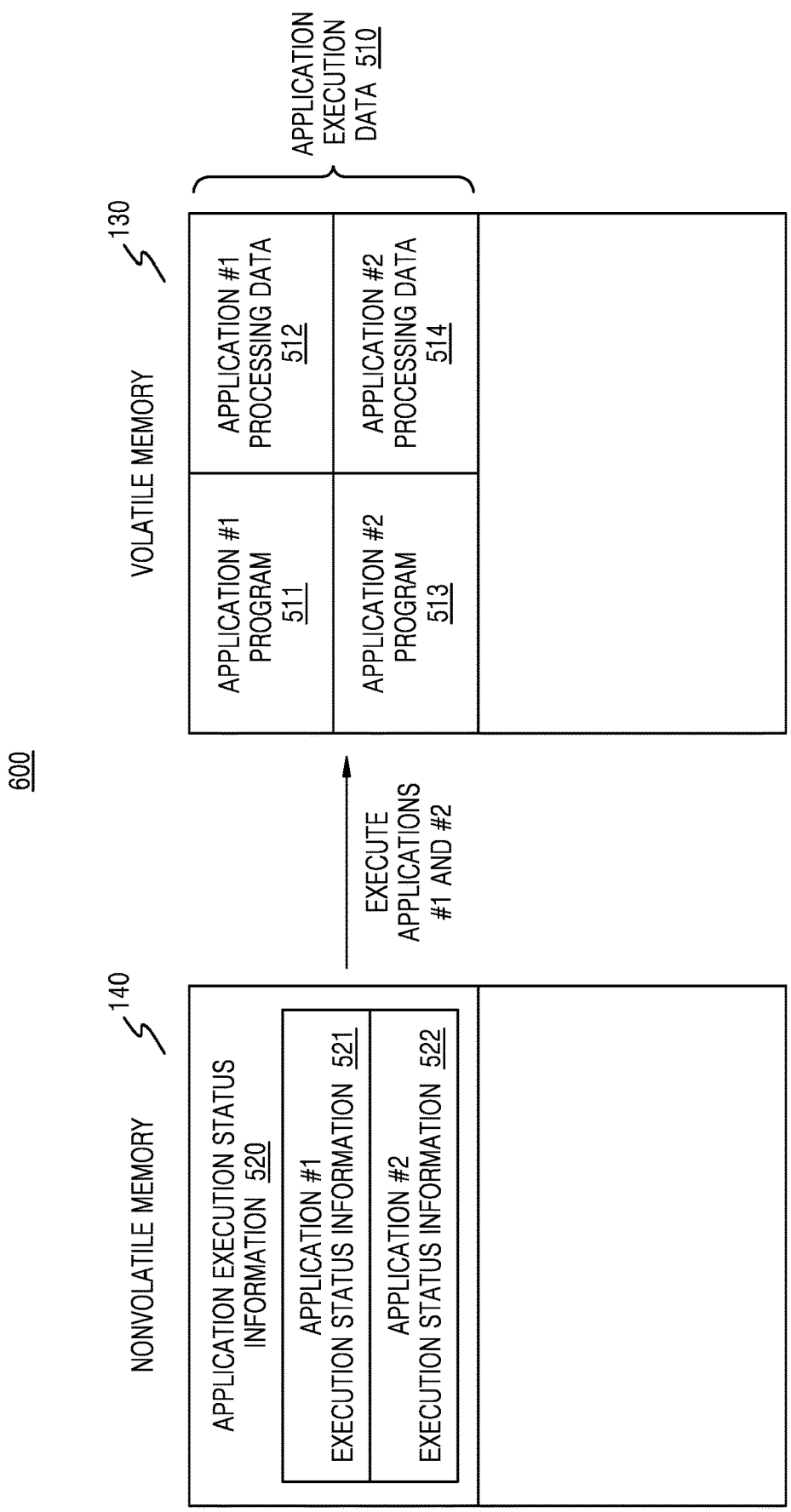
FIG. 6 illustrates an example of storing application execution data in a volatile memory by using application execution status information stored in a nonvolatile memory, according to an embodiment.

FIG. 6 illustrates an example of storing application execution data in a volatile memory by using application execution status information stored in a nonvolatile memory, according to an embodiment.

Referring to 600 of FIG. 6, application execution status information 520 stored in the nonvolatile memory 140 includes application #1 execution status information 521 and application #2 execution status information 522. The display apparatus 100 may execute application #1 by using application #1 execution status information. By executing the application #1 in this way, the display apparatus 100 may store in the volatile memory 130 application #1 program 511 and application #1 processing data 512 as application execution data. Furthermore, similarly, the display apparatus 100 may execute application #2 by using application #2 execution status information. By executing the application #2 in this way, the display apparatus 100 may store in the volatile memory 130 application #2 program 513 and application #2 processing data 514 as application execution data.

The display apparatus 100 may enter a power saving mode after storing the application execution data in the volatile memory. In this case, the power saving mode may be a suspend to RAM mode that retains the content of the volatile memory by supplying a minimum amount of power to the volatile memory.

In operation S450, the display apparatus 100 may resume, in response to a power-on input, execution of the application according to the application execution data stored in the volatile memory. Thus, as execution of the application is resumed, the display apparatus 100 may immediately display a corresponding application screen. Because the display apparatus 100 outputs the application screen based on the application execution data stored in the volatile memory 130 in this way, the operation time may be shortened compared to when loading an application program from the nonvolatile memory and executing an application.

Figure 7:
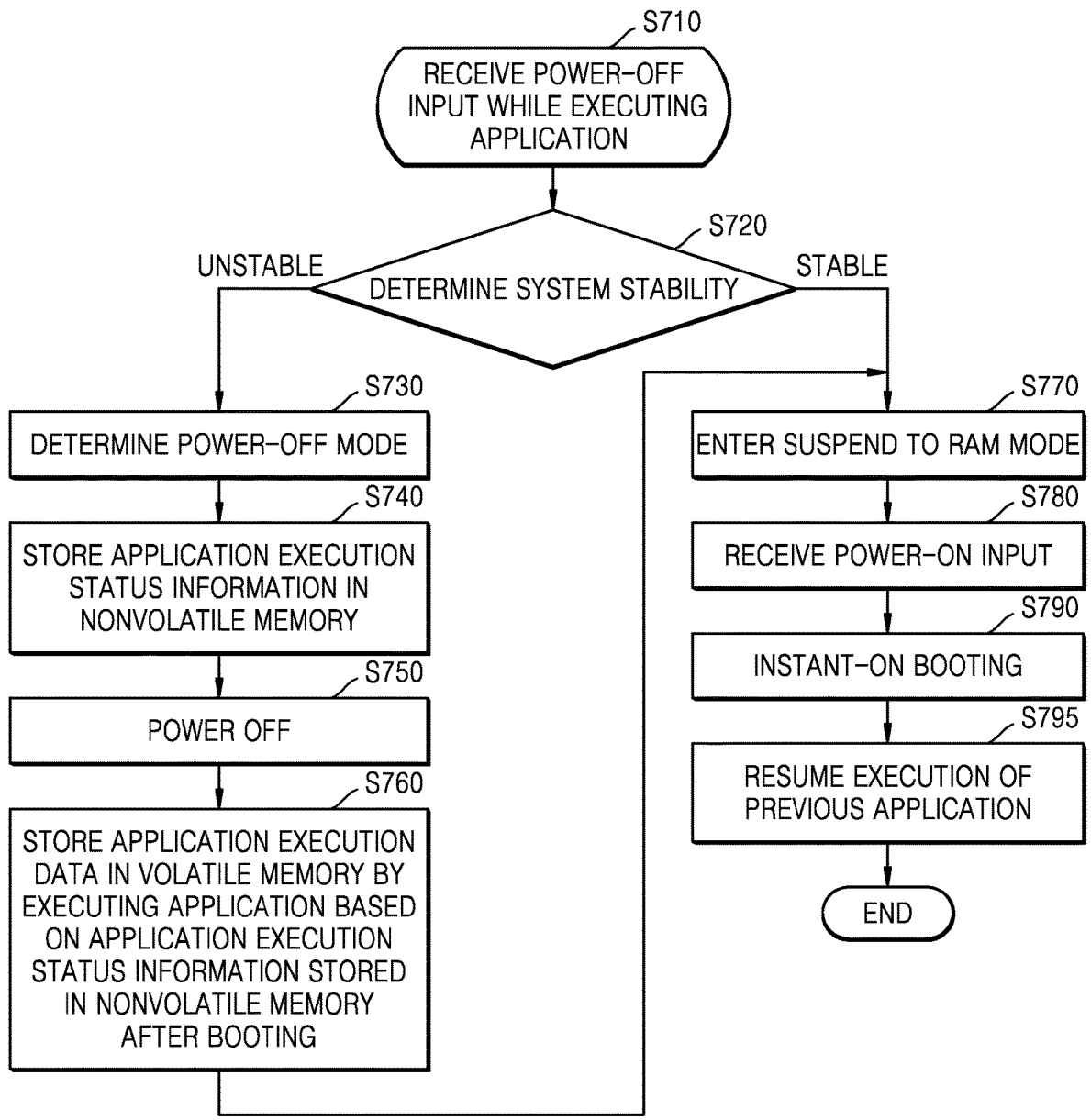
FIG. 7 is a flowchart of an example of an operation method of a display apparatus, according to an embodiment.

FIG. 7 is a flowchart of an example of an operation method of a display apparatus, according to an embodiment.

Referring to FIG. 7, in operation S710, the display apparatus 100 may receive a power-off input while executing an application.

In operation 720, the display apparatus 100 may check system stability in response to receiving the power-off input. In order to determine the system stability, the display apparatus 100 may check whether a running application is operating normally, whether a system internal memory is operating normally, whether a system driver or the like is malfunctioning, whether a collision (crash) occurs between running applications, whether a reboot is required due to a software update, etc.

In operation S730, when the system is determined to be unstable as a result of the determining of the system stability, the display apparatus 100 may determine to enter a power-off mode.

In operation S740, the display apparatus 100 may store application execution status information in the nonvolatile memory 140.

In other words, when determining to enter the power-off mode, the display apparatus 100 does not immediately perform power-off processing but stores in the nonvolatile memory 140 execution status information about one or more applications that were being executed at the time of receiving the power-off input. When the display apparatus 100 is powered off, power to all components including the volatile memory is cut off so all contents stored in the volatile memory 130 are lost. Therefore, the display apparatus 100 stores, in the nonvolatile memory 140, execution status information regarding a previous application that was being executed before being powered off so as to maintain information about the previous application. In this case, the application execution status information stored in the nonvolatile memory 140 will be described in detail below with reference to FIG. 8.

After storing the application execution status information in the nonvolatile memory 140 in operation S740, the display apparatus 100 may perform power-off processing, During the power-off processing, the display apparatus 100 cuts off power supply to most of the components including the volatile memory 130. Accordingly, the content stored in the volatile memory 130 may be removed.

In operation S750, the display apparatus 100 performs power-off processing.

In operation S760, the display apparatus may store application execution data in the volatile memory by performing booting after a predetermined time has lapsed and then executing the application by using the application execution status information stored in the nonvolatile memory. In detail, when a user's power-on input is received, the display apparatus 100 may perform a system initialization operation in advance for instant-on booting. In other words, to bring the system into an initial state in which the system is ready for use in an automatic suspend to RAM mode, the display apparatus 100 may read an OS into the volatile memory 130 after performing a power-on self-test to check the system. Furthermore, the display apparatus 100 may store application execution data in the volatile memory by executing the application based on the application execution status information stored in the nonvolatile memory.

In operation S770, the display apparatus 100 may enter a suspend to RAM mode.

When in the suspend to RAM mode, the display apparatus 100 cuts off power supply to most of the components of the display apparatus 100 but maintains power supply to the volatile memory 130. Thus, although the display apparatus 100 is powered off with the screen turned off and most of the components turned off, the volatile memory 130 may continuously retain all contents including the OS stored therein as well as details of the application that was being executed.

In operation S780, the display apparatus 100 receives a power-on input.

In operation S790, the display apparatus 100 may perform instant-on booting in response to receiving the power-on input. Instant-on booting is a boot process by which information necessary for system initialization, including an OS, is already stored in the volatile memory 130 so that the display apparatus 100 may be booted to a state in which it is ready to receive a user input.

In operation S795, according to the application execution data stored in the volatile memory 130, the display apparatus 100 may resume execution of a previous application that was being executed before being powered off and display an application screen.

In operation S720, when the system is determined to be stable, the display apparatus 100 may directly proceed to operation S770 to enter the suspend to RAM mode.

Figure 8:
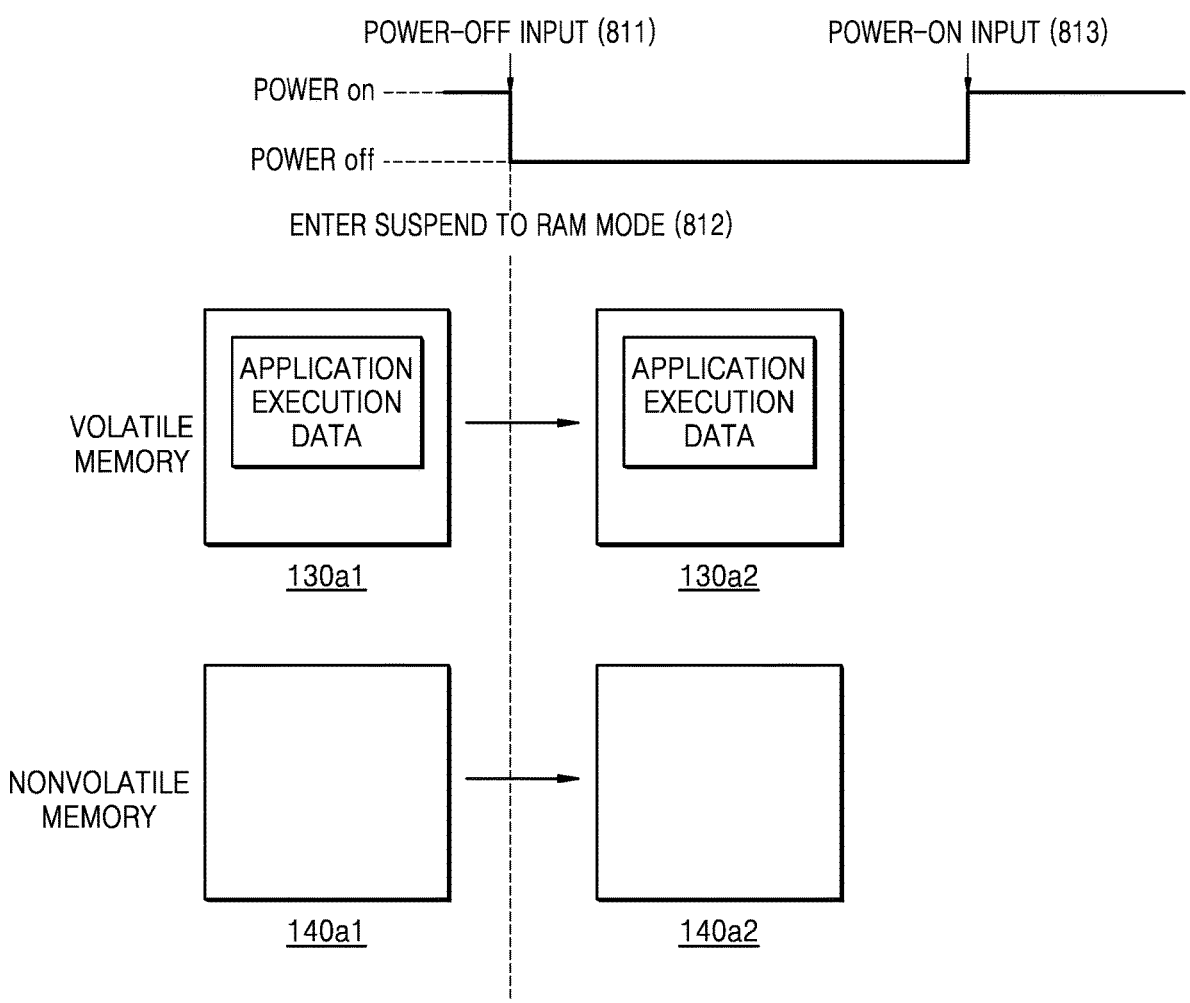
FIG. 8 is a diagram for showing states of a volatile memory and a nonvolatile memory when a system is determined to be stable and enters a suspend to RAM mode in an operation illustrated in FIG. 7.

FIG. 8 is a diagram for showing states of a volatile memory and a nonvolatile memory when a system is determined to be stable and enters a suspend to RAM mode in an operation illustrated in FIG. 7.

Referring to FIG. 8, at a time point when a power-off input is received, the volatile memory 130 shows a state 130a1 in which application execution data is stored by executing one or more applications. In response to the power-off input 811, the display apparatus 100 enters a suspend to RAM mode 812 in which the display apparatus 100 maintains the content of the volatile memory by supplying a minimum amount of power to the volatile memory, so the volatile memory maintains a state 130a in which its stored application execution data remains intact and is not lost. Accordingly, when a power-on input 813 is thereafter received, the display apparatus 100 may display an application screen during booting according to application execution data maintained in the volatile memory.

Figure 9:
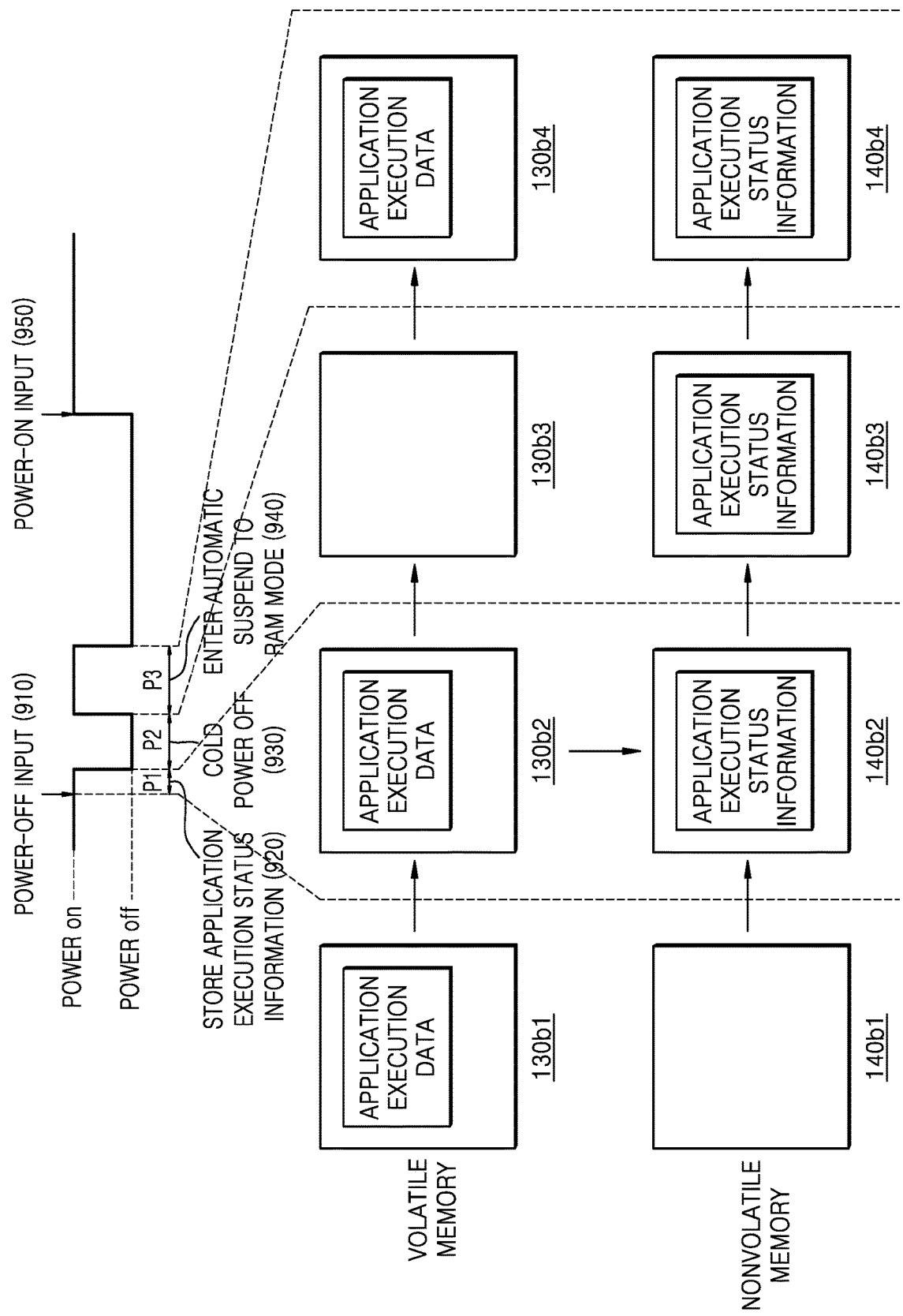
FIG. 9 is a diagram for showing states of a volatile memory and a nonvolatile memory when a system is determined to be unstable and enters a power-off mode in an operation illustrated in FIG. 7.

FIG. 9 is a diagram for showing states of a volatile memory and a nonvolatile memory when a system is determined to be unstable and enters a power-off mode in an operation illustrated in FIG. 7.

Referring to FIG. 9, at a time point when a power-off input 910 is received, the volatile memory 130 shows a state 130*b*1 in which application execution data is stored by executing one or more applications. The display apparatus 100 determines system stability in response to the power-off input 910, and when the system is determined to be unstable, the display apparatus 100 extracts application execution status information from the application execution data stored in the volatile memory in an interval P1 before power-off processing and stores the application execution status information in the nonvolatile memory (140*b*2).

Next, the display apparatus performs the power-off processing in an interval P2 (930). Because power supply to most of the components of the display apparatus 100 is interrupted by the power-off processing, the volatile memory does not maintain contents stored therein (130*b*3), while the nonvolatile memory maintains the application execution status information (140*b*3) because it retains contents stored therein due to its nature, regardless of whether power is supplied.

Then, the display apparatus enters an automatic suspend to RAM mode in an interval P3. Accordingly, the display apparatus 100 is powered on to perform a booting operation. In this case, the display apparatus also stores application execution data (130*b*4) by executing the application based on the application execution status information stored in the nonvolatile memory (140*b*3) and then enters a power saving mode.

Thus, when a power-on input 950 is thereafter received, the display apparatus 100 may display an application screen according to the application execution data maintained in the volatile memory (130*b*4) during booting.

Figure 10:
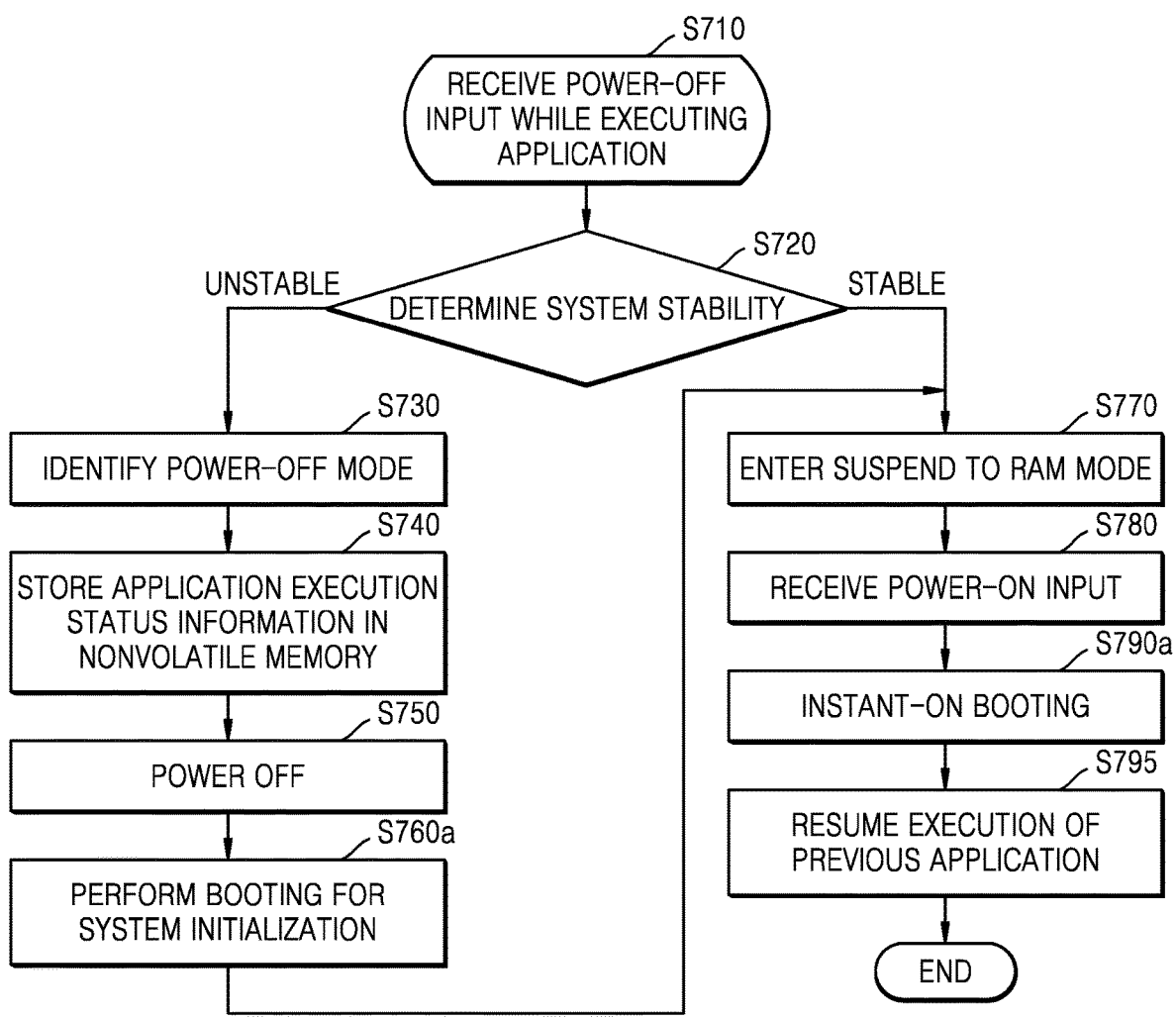
FIG. 10 illustrates a process for an operation method of a display apparatus, according to another embodiment.

FIG. 10 illustrates a process for an operation method of a display apparatus, according to another embodiment.

Operations illustrated in FIG. 10 are similar to the operations illustrated in FIG. 7 but differ from those in terms of operations S760*a* and 790*a*. In detail, in the operations illustrated in FIG. 7, the operation of storing the application execution data in the volatile memory by using the application execution status information stored in the nonvolatile memory is performed in operation S760 prior to the operation S770 of entering the suspend to RAM mode. However, in operations illustrated in FIG. 10, an operation of storing application execution data in the volatile memory is performed during an instant-on boot operation 790*a* after receiving a power-on input.

In other words, in operation 760*a* in FIG. 10, to bring the system into an initial state in which the system is ready for use in an automatic suspend to RAM mode, the display apparatus 100 may read an OS into the volatile memory 130 after performing a power-on self-test to check the system.

In operation S770, the display apparatus 100 may enter a suspend to RAM mode.

In operation S780, the display apparatus 100 receives a power-on input.

In operation S790*a*, the display apparatus 100 may perform instant-on booting in response to receiving the power-on input. Instant-on booting is a boot process by which information necessary for system initialization, including an OS, is already stored in the volatile memory 130 so that the display apparatus 100 may be booted to a state in which it is ready to receive a user input. During the instant-on booting, the display apparatus may also store application execution data in the volatile memory by executing the application based on the application execution status information stored in the nonvolatile memory.

In operation S795, according to the application execution data stored in the volatile memory 130, the display apparatus 100 may resume execution of a previous application that was being executed before being powered off and display an application screen.

When the previous application is previously executed in operation S760 as illustrated in FIG. 7, the time required to read the application execution status information regarding the previous application from the nonvolatile memory 140 may be shortened, and accordingly, the time required to display a previous application screen in operation S795 may be reduced.

When the operation of executing a previous application by reading application execution status information from the nonvolatile memory is performed in operation S790*a* as illustrated in FIG. 10, a normal booting operation only has to be performed in operation 760*a*, so algorithm to operate the system may be simplified.

Figure 11:
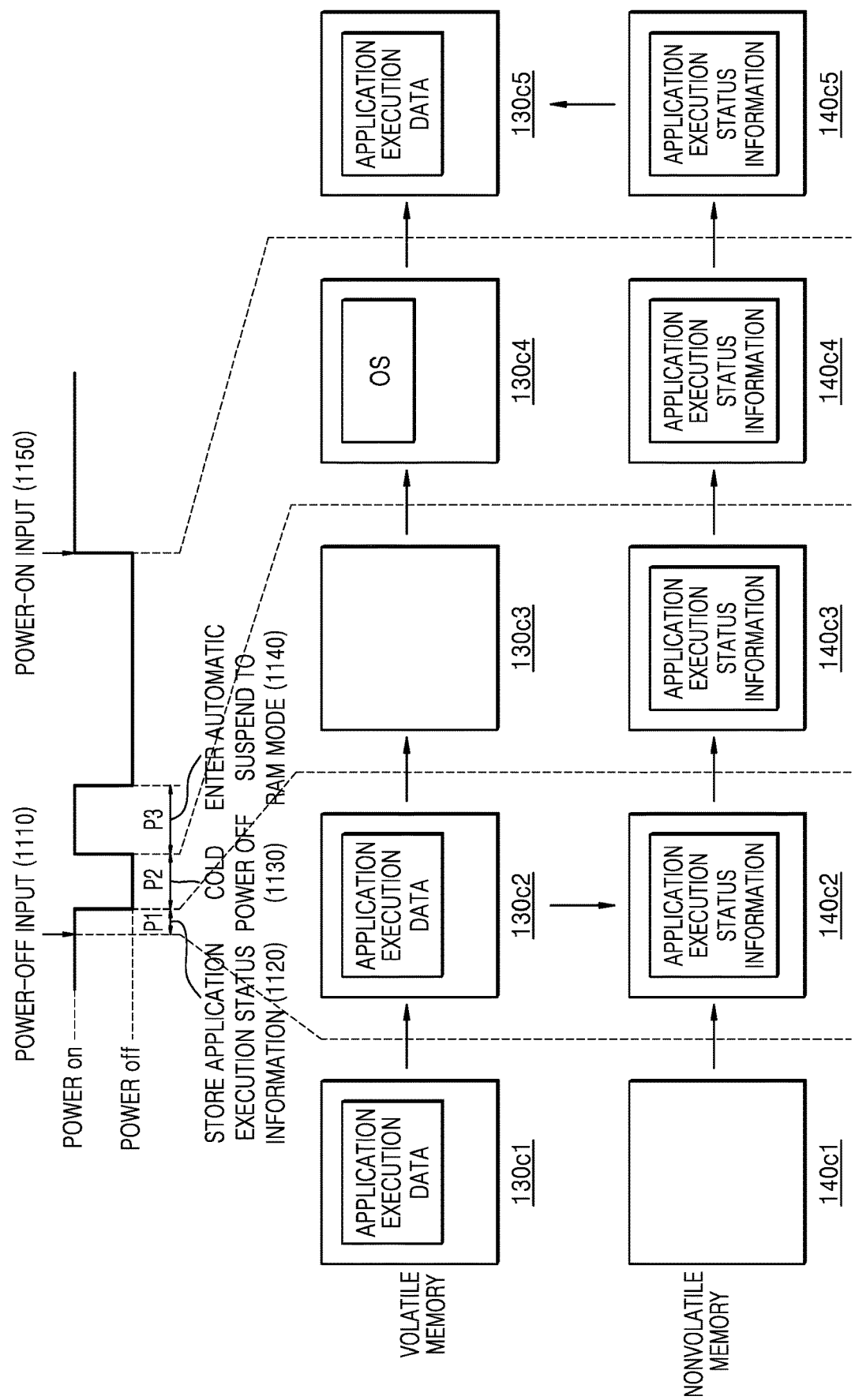
FIG. 11 is a diagram for showing states of a volatile memory and a nonvolatile memory when a system is determined to be unstable and enters a power-off mode in an operation illustrated in FIG. 10.

FIG. 11 is a diagram for showing states of a volatile memory and a nonvolatile memory when a system is determined to be unstable and enters a power-off mode in an operation illustrated in FIG. 10.

Referring to FIG. 11, at a time point when a power-off input 1110 is received, the volatile memory 130 shows a state 130*c*1 in which application execution data is stored by executing one or more applications. The display apparatus 100 determines system stability in response to the power-off input 1110, and when the system is determined to be unstable, the display apparatus 100 extracts application execution status information from the application execution data stored in the volatile memory in an interval P1 before power-off processing and stores the application execution status information in the nonvolatile memory (140*c*2).

Next, the display apparatus performs the power-off processing in an interval P2 (1130). Because power supply to most of the components of the display apparatus 100 is interrupted by the power-off processing, the volatile memory does not maintain contents stored therein (130*c*3), while the nonvolatile memory maintains the application execution status information (140*c*3) because it retains contents stored therein due to its nature, regardless of whether power is supplied.

Then, the display apparatus enters an automatic suspend to RAM mode in an interval P3 (1140). Therefore, the display apparatus 100 is powered on to perform a booting operation. By performing the booting operation, the display apparatus reads an OS into the volatile memory (130*c*4) as a system initialization operation and then enters a power saving mode.

Thus, when a power-on input 1150 is thereafter received, the display apparatus may store the application execution data in the volatile memory (130*c*5) by executing the application based on the application execution status information stored in the nonvolatile memory (140*c*5) during booting, and then resume execution of the application according to the application execution data.

Figure 12:
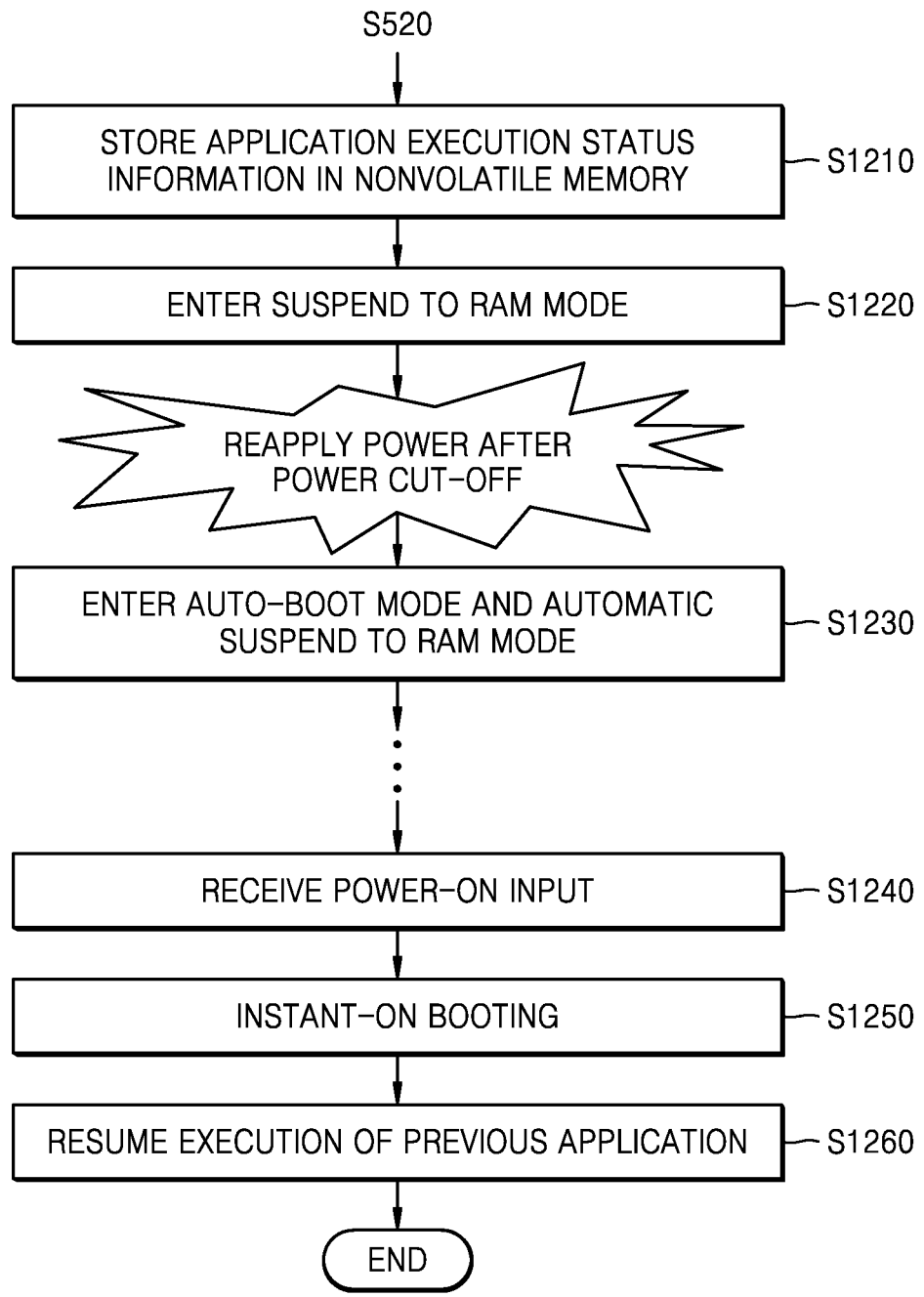
FIG. 12 is a flowchart of another example of an operation method of a display apparatus when a system is determined to be stable, according to an embodiment.

FIG. 12 is a flowchart of another example of an operation method of a display apparatus when a system is determined to be stable, according to an embodiment.

Referring to FIG. 12, even when the system is determined to be stable as a result of the determining of the system stability in operation 720 of FIG. 7, in operation S1210, the display apparatus 100 may store application execution status information in the nonvolatile memory 140.

In other words, in a general case, the display apparatus 100 may maintain the contents of the volatile memory because it enters, upon receiving a power-off input, a suspend to RAM mode in which the contents of the volatile memory are maintained when the system is stable. However, when power supply to the display apparatus 100 is cut off due to a power failure or the like after entering the suspend to RAM mode, the contents stored in the volatile memory 130 may be lost. Thus, according to an embodiment, considering such a situation, it may be desirable to store application execution status information in the nonvolatile memory 140 even when the system is stable.

In operation S1220, the display apparatus 100 may enter a suspend to RAM mode.

In the suspend to RAM mode, the display apparatus 100 cuts off power supply to most of its components but maintains power supply to the volatile memory 130. Thus, even though the display apparatus 100 is powered off with the screen turned off and most of the components turned off, the volatile memory 130 may continuously retain all contents including an OS stored therein as well as details of the application that was being executed.

Thereafter, power may be reapplied after an interruption of power supply to the display apparatus 100 due to a certain reason, e.g., a power outage.

When power is reapplied after the interruption of the power supply, in operation S1230, the display apparatus 100 may enter an auto-boot mode and an auto suspend to RAM mode.

In detail, when a user's power-on input is received, the display apparatus 100 may perform a system initialization operation in advance for instant-on booting. In other words, to bring the system into an initial state in which the system is ready for use in an automatic suspend to RAM mode, the display apparatus 100 may read an OS into the volatile memory 130 after performing a power-on self-test to check the system. After loading information necessary for maintaining an initial state of the system, such as an OS, into the volatile memory 130, the display apparatus 100 is in a powered-off state such that it maintains power supply to only the volatile memory 130 and interrupts the power supply to the other components of the display apparatus 100. Furthermore, the display apparatus 100 may store application execution data in the volatile memory by executing the application using the application execution status information stored in the nonvolatile memory 140. Then, the display apparatus 100 may enter a power saving mode.

In operation S1240, the display apparatus 100 may then receive a power-on input.

In operation S1250, the display apparatus 100 may perform instant-on booting in response to receiving the power-on input. In operation S1250, because the display apparatus 100 has already maintained an OS in the volatile memory, the display apparatus 100 may boot instantly to a state in which it is ready to receive a user input.

In operation S1260, the display apparatus 100 may also resume execution of the previous application according to the application execution data stored in the volatile memory 130 and display an executed application screen.

Figure 13:
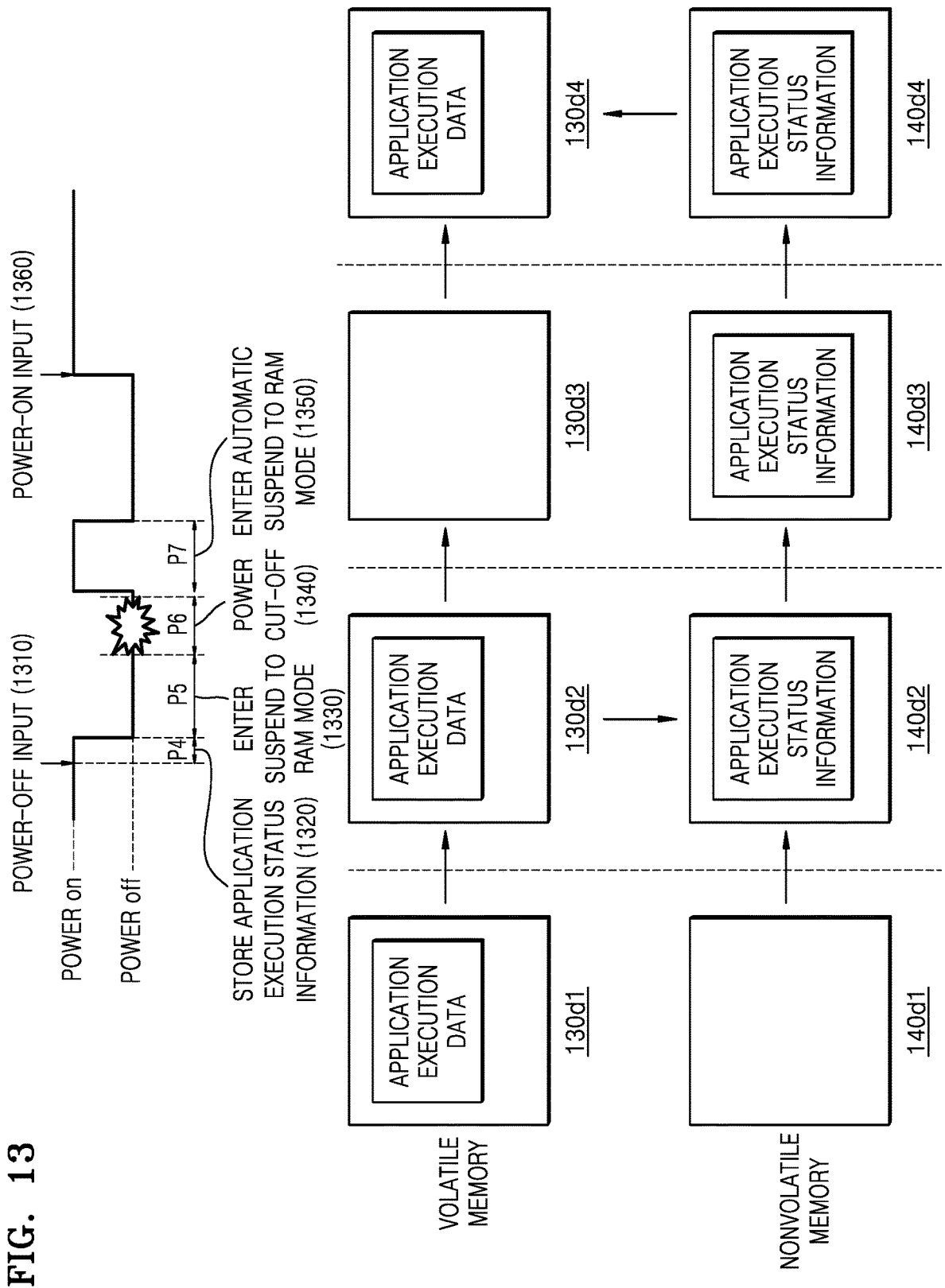
FIG. 13 is a diagram for showing states of a volatile memory and a nonvolatile memory in an operation illustrated in FIG. 12.

FIG. 13 is a diagram for showing states of a volatile memory and a nonvolatile memory in an operation illustrated in FIG. 12.

Referring to FIG. 13, at a time point when a power-off input 1310 is received, the volatile memory 130 shows a state 130*d*1 in which application execution data is stored by executing one or more applications. The display apparatus 100 determines system stability in response to the power-off input 1310, and even when the system is determined to be stable, the display apparatus 100 extracts application execution status information from the application execution data stored in the volatile memory in an interval P4 before power-off processing and stores the application execution status information in the nonvolatile memory (140*d*2).

Next, the display apparatus enters a suspend to RAM mode in an interval P5 (1330). Because a minimum amount of power is continuously supply to the volatile memory in the suspend to RAM mode, the volatile memory maintains contents stored therein (130*d*3), while the nonvolatile memory maintains the application execution status information (140*d*3) because it retains contents stored therein due to its nature, regardless of whether the power is supplied.

Then, the display apparatus 100 may undergo a power cutoff due to a certain reason, such as a power outage in an interval P6. In this case, because power supply to the display apparatus 100 is physically interrupted, power supply to the volatile memory is also stopped, and thus, contents of the volatile memory may not be maintained (130*d*3).

When power is reapplied again to the display apparatus 100 after the power cutoff, the display apparatus may enter an automatic suspend to RAM mode in an interval P7. Thus, the display apparatus 100 is powered on to perform a booting operation. In this case, the display apparatus also stores application execution data (130*d*4) in the volatile memory by executing the application based on the application execution status information stored in the nonvolatile memory (140*d*4) and then enters a power saving mode.

Accordingly, when a power-on input 1360 is thereafter received, the display apparatus 100 may resume execution of the application and display an application screen according to the application execution data retained in the volatile memory during booting (130*d*4).

Figure 14:
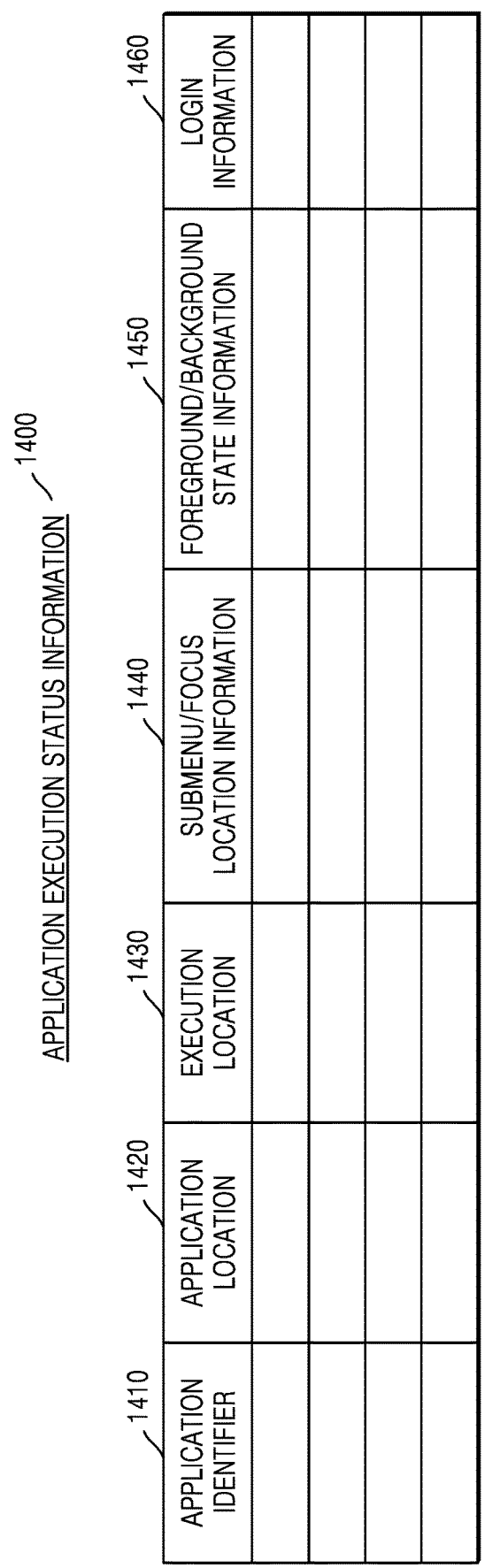
FIG. 14 illustrates application execution status information according to an embodiment.

FIG. 14 illustrates application execution status information according to an embodiment.

Referring to FIG. 14, when the display apparatus 100 receives a power-off input, execution status information 1400 of an application that was being executed, the execution status information 1400 being stored in the nonvolatile memory, may include at least one of an application identifier 1410, an application location 1420, an application execution position 1430, submenu/focus position information 1440, foreground/background state information 1450, and login information 1460.

The application identifier 1410 indicates a name for identifying the application. For example, the application identifier 1410 may be a name such as YouTube or Netflix.

The application location 1420 indicates location information used to access the application. For example, the application location 1420 may be a video universal resource locator (URL) or a web URL address. For example, the location information 1420 may be a video link 1510 shown in FIG. 15.

When specific content is provided by execution of an application, the application execution position 1430 may indicate a content progress position. For example, when specific content is played on a Netflix or YouTube application, the application execution position 1430 may be a playback position in the specific content.

Figure 15:
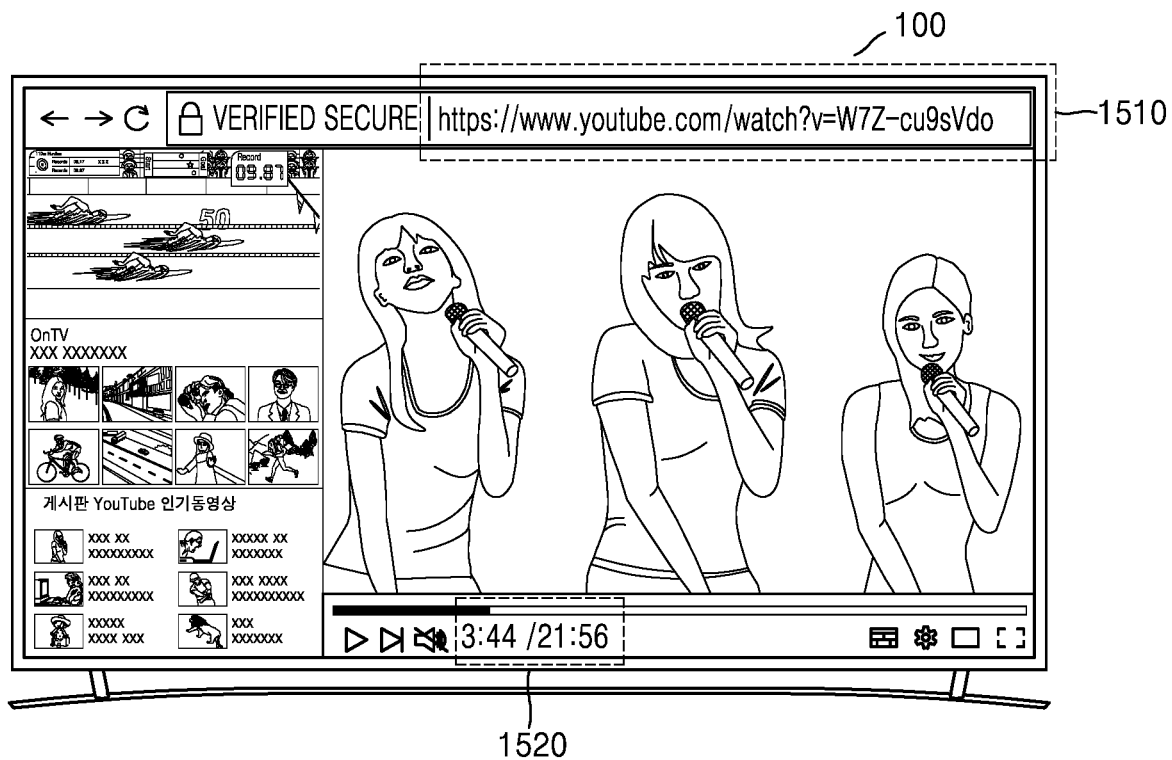
FIG. 15 illustrates an example of an application execution screen.

FIG. 15 illustrates an example of an application execution screen.

For example, referring to FIG. 15, when the display apparatus 100 has played content on a YouTube application for 3:44 minutes before receiving a power-off input, the display apparatus 100 may store, in addition to the application identifier 1410 and the application location 1420, 3:44 minutes that is an application execution position in the nonvolatile memory. Therefore, when powered back on and booted, the display apparatus 100 may not only put the previous application into an execution state by using the application identifier 1410 and the application location 1420 stored in the nonvolatile memory but may also display a portion of the content corresponding to the 3:44 minutes by using 3:44 that is the application execution position. Accordingly, the user may be provided with an experience that specific content is executed continuously from an execution position in previously executed content of the application even when the display apparatus 100 is powered back on from the powered-off state.

Figure 16:
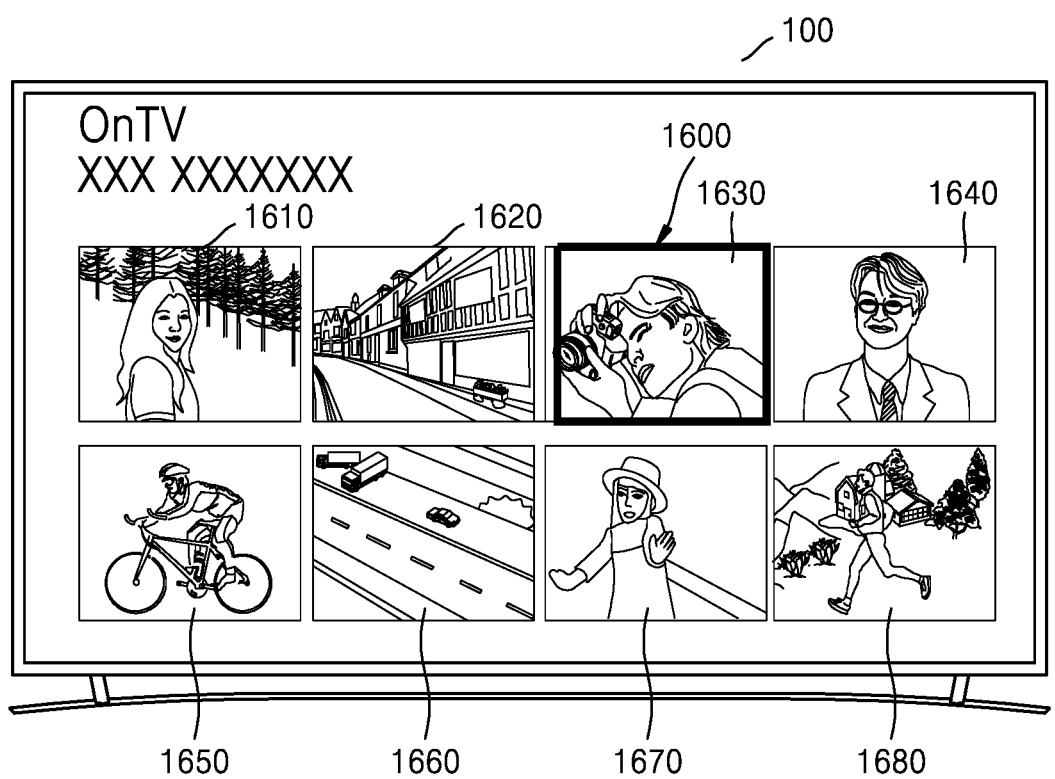
FIG. 16 illustrates another example of an application execution screen.

The submenu/focus position information 1440 may indicate a position selected or focused when a plurality of submenus or a plurality of selection items are provided by execution of an application. For example, referring to FIG. 16, the display apparatus 100 may execute a content-providing application and display a plurality of content items 1610 through 1680 on the content-providing application. A focus 1600 may be placed on the item 1630 before a power-off input is received by the display apparatus 100. When the display apparatus 100 stores execution status information of the application that was being executed in response to receiving the power-off input, the display apparatus 100 may store not only the application identifier and the application location information but also a focus position, i.e., information indicating that the focus is placed on the item 1630. Thus, when the display apparatus 100 is booted at a later time after power-off, the display apparatus 100 may not only instantly execute the previous application by using the application identifier 1410 and the application location information 1420, included in the application execution status information stored in the nonvolatile memory, but may also display a last focus position in the previous application by using the submenu/focus position information 1440. Therefore, the user may experience the same application execution state as that before the display apparatus 100 is powered off.

The submenu/focus position information 1440 may be difficult to obtain according to a policy for a provider of the corresponding application. When it is difficult to obtain the submenu/focus position information 1440 according to the policy for the provider of the corresponding application, storage of the submenu/focus position information 1440 may be omitted.

The foreground/background state information 1450 indicates whether the running application is being displayed at the front (foreground) on the display apparatus 100 or whether the application is active but waiting in the background rather than being displayed at the front.

For example, the display apparatus 100 may execute a first application according to a user's selection and then execute a second application according to a user's another selection without terminating the first application. In this case, the second application remains displayed at the front on a screen of the display apparatus 100 while the first application is in an active state but is not currently displayed at the front of the screen and may be displayed at the front again at any time by the user's selection. Accordingly, when the power-off input is received while the applications are being executed in this way, the display apparatus 100 may store execution status information of the first application and execution status information of the second application in the nonvolatile memory. In this case, the display apparatus 100 may store information indicating that the first application is in the background state as the foreground/background state information 1450 for the first application while storing information indicating that the second application is in the foreground state as the foreground/background state information 1450 for the second application. Thereafter, when the display apparatus 100 is powered back on and booted, based on the application execution status information stored in the nonvolatile memory, the display apparatus 100 may display the second application in the foreground in a running state while the first application in the background state may be preloaded according to a preloading execution policy and put in a ready state for execution, Thus, the user may experience the same application execution state as before the display apparatus 100 is powered off, and when the user selects the first application in the background state, the display apparatus 100 may quickly execute the first application by switching the first application from the background state to the foreground state.

According to an embodiment, the display apparatus 100 may store execution status information regarding applications in the foreground state and the background state in the nonvolatile memory.

According to an embodiment, the display apparatus 100 may store execution status information of an application in the foreground state in the nonvolatile memory, except for an application in the background state.

The login information 1460 may indicate login information such as an ID and/or password required when an application is executed. The display apparatus 100 may or may not obtain login information required to execute an application according to a policy for each application provider. When the running application is in a logged-on state and when the running application provides login information, the display apparatus 100 may also store the login information in the nonvolatile memory.

When login is required for execution of an application and when login information is stored in the nonvolatile memory, the display apparatus 100 may display, when rebooted after power-off, a logged-on state by using the login information while executing the previous application.

When login is required for execution of the application and when the display apparatus 100 may not obtain login information because the application does not provide the login information, the display apparatus 100 may not store the login information in the nonvolatile memory. In this case, when rebooted after power-off, the display apparatus 100 may display an initial screen seen before login while executing the previous application.

An operation method of a display apparatus according to an embodiment may be implemented in the form of program instructions that may be performed by various types of computers and may be recorded on computer-readable recording media. The computer-readable recording media may include program instructions, data files, data structures, etc. either alone or in combination. The program instructions recorded on the computer-readable recording media may be designed and configured specially for the present disclosure or may be known to and be usable by those skilled in the art of computer software. Examples of the computer-readable recording media include magnetic media such as hard disks, floppy disks, and magnetic tape, optical media such as compact disk ROM (CD-ROM) and digital versatile disks (DVDs), magneto-optical media such as floptical disks, and hardware devices that are specially configured to store and perform program instructions, such as ROM, RAM, flash memory, etc. Examples of program instructions include not only machine code such as that created by a compiler but also higher level language code that may be executed by a computer using an interpreter or the like.

While embodiments have been particularly described, the embodiments are not to be construed as limiting the scope of the disclosure, and various changes and modifications made by those of ordinary skill in the art based on the basic concept of the present disclosure also fall within the scope as defined by the following claims.

The invention claimed is:

1. A display apparatus comprising:
a volatile memory;
a nonvolatile memory; and
a processor configured to:
receive a power-off input for the display apparatus;
in response to receiving the power-off input, obtain information on a system status of the display apparatus;
determine whether the system status of the display apparatus is identified as unstable, wherein a malfunctioning of a system driver, application, or memory indicates an unstable system or a requirement for a reboot for a software update indicates the unstable system; and
in response to the system status of the display apparatus being identified as unstable:
store, in the nonvolatile memory, execution status information of the application currently being executed in the volatile memory;
perform a rebooting operation after storing the execution status information in the nonvolatile memory; and
enter a suspend-to-RAM mode after performing the rebooting operation by:
storing, in the volatile memory, execution data regarding the application which is obtained by executing the application by using application execution status information stored in the nonvolatile memory, and
maintaining a power supply to the volatile memory.

2. The display apparatus of claim 1, wherein the processor is further configured to, when receiving a power-on input for the display apparatus that is in the suspend-to-RAM mode, resume execution of the application by using the execution data regarding the application, which is stored in the volatile memory.

3. The display apparatus of claim 1, wherein the application execution status information includes at least one of an identifier of the application, location information for accessing the application, and execution position information of the application.

4. The display apparatus of claim 1, wherein the execution data regarding the application includes an application program being executed and data related to execution of the application.

5. The display apparatus of claim 1, wherein the processor is further configured to maintain a display of the display apparatus in an off state when performing the rebooting operation.

6. The display apparatus of claim 1, wherein
the processor is further configured to determine the system status of the display apparatus in response to the receiving of the power-off input.

7. The display apparatus of claim 1, wherein
the processor is further configured to, when the system status of the display apparatus is identified to be unstable, store data representing the system status of the display apparatus in the volatile memory or the nonvolatile memory, and determine, in response to the receiving of the power-off input, a method of entering a power saving mode by referring to the data representing the system status of the display apparatus, the data being stored in the volatile memory or the nonvolatile memory.

8. An operation method of a display apparatus, the operation method comprising:
receiving a power-off input for the display apparatus;
in response to receiving the power-off input, obtain information on a system status of the display apparatus;
determining whether the system status of the display apparatus is identified as unstable, wherein a malfunctioning of a system driver, application, or memory indicates an unstable system or a requirement for a reboot for a software update indicates the unstable system; and
in response to the system status of the display apparatus being identified as unstable:
storing, in nonvolatile memory, execution status information of the application currently being executed in volatile memory;
performing a rebooting operation after storing the execution status information in the nonvolatile memory; and
entering a suspend-to-RAM mode after performing the rebooting operation by:
storing, in the volatile memory, execution data regarding the application which is obtained by executing the application by using application execution status information stored in the nonvolatile memory, and
maintaining a power supply to the volatile memory.

9. The operation method of claim 8, further comprising, when receiving a power-on input for the display apparatus that is in the suspend-to-RAM mode, resuming execution of the application by using the execution data regarding the application, which is stored in the volatile memory.

10. The operation method of claim 8, wherein
the application execution status information includes at least one of an identifier of the application, location information for accessing the application, and execution position information of the application.

11. The operation method of claim 8, wherein the execution data regarding the application includes an application program being executed and data related to execution of the application.

12. The operation method of claim 8, further comprising, maintaining a display of the display apparatus in an off state when performing the rebooting operation.

13. The operation method of claim 8, further comprising determining the system status of the display apparatus in response to the receiving of the power-off input.

14. The operation method of claim 8, further comprising, when the system status of the display apparatus is identified to be unstable, storing data representing the system status of the display apparatus in the volatile memory or the nonvolatile memory, and determining, in response to the receiving of the power-off input, a method of entering a power saving mode by referring to the data representing the system status, the data being stored in the volatile memory or the nonvolatile memory.

15. A non-transitory computer-readable recording medium having stored therein a program for performing an operation method of a display apparatus, the operation method comprising:
- receiving a power-off input for the display apparatus;
- in response to receiving the power-off input, obtaining information on a system status of the display apparatus;
- determine whether the system status of the display apparatus is identified as unstable, wherein a malfunctioning of a system driver, application, or memory indicates an unstable system or a requirement for a reboot for a software update indicates the unstable system; and
- in response to the system status of the display apparatus being identified as unstable:
  - storing, in nonvolatile memory, execution status information of the application currently being executed in volatile memory;
  - performing a rebooting operation after storing the execution status information in the nonvolatile memory; and
  - entering a suspend-to-RAM mode after performing the rebooting operation by:
    - storing, in the volatile memory, execution data regarding the application which is obtained by executing the application by using application execution status information stored in the nonvolatile memory, and
    - maintaining a power supply to the volatile memory.

* * * * *